US010985853B2

(12) United States Patent
Bretherton

(10) Patent No.: US 10,985,853 B2
(45) Date of Patent: *Apr. 20, 2021

(54) METHOD AND SYSTEM FOR REAL-TIME BROADCAST AUDIENCE ENGAGEMENT

(71) Applicant: Peter Bretherton, Crosby, TX (US)

(72) Inventor: Peter Bretherton, Crosby, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/584,671

(22) Filed: Sep. 26, 2019

(65) Prior Publication Data
US 2020/0021377 A1    Jan. 16, 2020

Related U.S. Application Data

(63) Continuation of application No. 16/413,782, filed on May 16, 2019, now Pat. No. 10,432,335, which is a continuation of application No. PCT/US2017/059703, filed on Nov. 2, 2017.

(51) Int. Cl.
| | |
|---|---|
| *H04H 60/32* | (2008.01) |
| *H04H 60/33* | (2008.01) |
| *G06Q 30/02* | (2012.01) |
| *H04H 60/31* | (2008.01) |
| *H04N 21/442* | (2011.01) |
| *H04H 60/66* | (2008.01) |

(52) U.S. Cl.
CPC ......... *H04H 60/33* (2013.01); *G06Q 30/0201* (2013.01); *H04H 60/31* (2013.01); *H04H 60/32* (2013.01); *H04H 60/66* (2013.01); *H04N 21/44218* (2013.01)

(58) Field of Classification Search
CPC ................................................ H04N 21/44218

USPC ............................................................ 725/14
See application file for complete search history.

(56) References Cited

U.S. PATENT DOCUMENTS

| 10,432,335 | B2* | 10/2019 | Bretherton | ............. H04H 60/32 |
| 2002/0042920 | A1* | 4/2002 | Thomas | ............... H04N 21/235 |
| | | | | 725/87 |
| 2002/0056087 | A1* | 5/2002 | Berezowski | ........... H04N 5/445 |
| | | | | 725/9 |
| 2007/0124756 | A1* | 5/2007 | Covell | ................... H04N 5/445 |
| | | | | 725/18 |

(Continued)

OTHER PUBLICATIONS

International search report of International Search Authority (USPTO) for PCT international application PCT/US2017/059703 filed on Nov. 2, 2017.

(Continued)

*Primary Examiner* — Michael B. Pierorazio
(74) *Attorney, Agent, or Firm* — Angelo IP; Basil M. Angelo

(57) ABSTRACT

A method and system for real-time broadcast audience engagement independent of the act of broadcasting, means of broadcasting, or broadcasting partner includes providing a list of broadcast shows currently being broadcast live to user, receiving the user's selection of a broadcast show from the list, providing the user with a binary reaction interface for the selected broadcast show, receiving the user's binary reaction based on the user's interaction with the binary reaction interface, and providing the selected broadcast show with one or more metrics of real-time broadcast audience engagement based, at least in part, on the user's binary reaction.

21 Claims, 18 Drawing Sheets

(56) References Cited

U.S. PATENT DOCUMENTS

| | | | |
|---|---|---|---|
| 2007/0271518 A1* | 11/2007 | Tischer | H04N 21/44222 715/744 |
| 2007/0271580 A1* | 11/2007 | Tischer | H04N 21/4532 725/35 |
| 2008/0086742 A1 | 4/2008 | Aldrey et al. | |
| 2013/0247081 A1 | 9/2013 | Vinson et al. | |
| 2014/0123191 A1 | 5/2014 | Hahn et al. | |

OTHER PUBLICATIONS

Written opinion of International Search Authority (USPTO) for PCT international application PCT/US2017/059703 filed on Nov. 2, 2017.

USPTO notice of allowance in U.S. Appl. No. 16/413,782, filed May 16, 2019, dated Aug. 13, 2019.

* cited by examiner

210

345

RETURN TO DASHBOARD

Show Name
METRICS

525

Select dates and frequency of Metrics:

Start Date:    through    End Date:

○ Month    ○ Week    ○ Day

530

Select emails to receive Metrics data:
(Metrics data is confidential property of this show)

○ showhost@email.com
○ showproducer@email.com
○ programdirector@email.com
○ stationmanager@email.com

SUBMIT
If you need to modify your distribution list for your metrics data, please email showsupport@email.com

RETURN TO DASHBOARD

Show Name
SETTINGS

535

540

CHANGE PASSWORD
Current Password

Password must be between 8 and 12 characters, must contain at least one lower case letter, at least one number, and at least one special character New Password Re-enter New Password

SUBMIT

CHANGE NAME
The current show name is Show Name

The show name can be up to 21 characters in length. It may not contain any special characters. The name will reflect any capitalizations entered.

New Show Name

Re-enter New Show Name

SUBMIT

CHANGE Web Address — 545

SUBMIT

RETURN TO DASHBOARD
Show Name
ADVERTISERS

560

Nickname [    ]         Full name [    ]

565

Link [    ]                 Discount Code [    ]

570

Advertisement Verbiage         Ad Graphic
Line 1 – Up to xx characters       Graphic must be xxx by xxx pixels
[    ]

Line 2 – Up to xx characters
[    ]

Line 3 – Up to xx characters
[    ]

Line 4 – Up to xx characters       Upload graphic
[    ]                             [    ]
                                   Browse            Select

SUBMIT                              DELETE AD

| Station | Frequency | Update Date | Update Time | Latitude | Longitude |
|---|---|---|---|---|---|
| KPRC Houston | 950 | 8/15/2019 | 2:55pm | 31.322396574571098 | -89.3501836527971 |
| KPRC Houston | 950 | 8/15/2019 | 2:35pm | 29.725842999376024 | -95.45365073789438 |
| KPRC Houston | 950 | 8/15/2019 | 3:00pm | 30.027695 | -95.61371 |
| KPRC Houston | 950 | 8/15/2019 | 2:49pm | 29.691714767933423 | -95.49634880991043 |
| KPRC Houston | 950 | 8/15/2019 | 2:05pm | 29.698717911788766 | -95.39403245315792 |
| KPRC Houston | 950 | 8/15/2019 | 2:19pm | 35.409541 | -101.63551 |
| KPRC Houston | 950 | 8/14/2019 | 2:49pm | 29.725789 | -95.473224 |
| KPRC Houston | 950 | 8/13/2019 | 4:08pm | 32.46498609896047 | -93.65571987823924 |
| KPRC Houston | 950 | 8/13/2019 | 2:15pm | 30.374065542036345 | -95.61507062478968 |
| KPRC Houston | 950 | 8/13/2019 | 2:40pm | 29.759108 | -95.454707 |

FIG. 5F

METHOD AND SYSTEM FOR REAL-TIME BROADCAST AUDIENCE ENGAGEMENT

CROSS-REFERENCE TO RELATED APPLICATIONS

This application is a continuation-in-part of U.S. patent application Ser. No. 16/413,782, filed on May 16, 2019, now issued as U.S. Pat. No. 10,432,335 on Oct. 1, 2019, which is a continuation of PCT International Application PCT/US2017/059703, filed on Nov. 2, 2017, both of which are hereby incorporated by reference in their entirety.

BACKGROUND OF THE INVENTION

Broadcasting includes the live transmission of audio and/or visual content to a wide audience. Conventional means of broadcasting include terrestrial and satellite transmission of content via electromagnetic waves. More recent means of conventional broadcasting include streaming, podcasting, and any other type or kind of provision of live content, typically via the Internet or other network connections regardless of the transmission medium. Audience members typically consume broadcast content via conventional radio or television receivers and increasingly via smartphones, tablets, laptops, and other personal computing devices. In this age of ubiquitous connectivity, audience members typically have access to a number of devices capable of receiving broadcast content at all times. As such, there is more broadcast content available than ever before and corresponding competition for audience and audience engagement.

While the nature of broadcasting has and continues to change, broadcasters still seek to monetize their content, typically based, directly or indirectly, on the sale of advertisements that run before, during, or after a broadcast show. Advertisement rates are typically tied to one or more conventional metrics of broadcast audience engagement, such as, for example, Nielsen ratings. Broadcast shows with higher ratings command correspondingly higher advertisement rates. As such, broadcast shows have a vested financial interest in maximizing their audience engagement. Conventional metrics of broadcast audience engagement include surveys, ratings, call-in lines, and social media, each of which is substantially limited in scope and typically only appeal to a very small segment of the broadcast audience. Moreover, these conventional metrics of broadcast audience engagement lack immediacy, proximity, and transparency to the broadcaster actually generating the broadcast content and only provide feedback, if any, to broadcasters well after a broadcast has already concluded.

BRIEF SUMMARY OF THE INVENTION

According to one aspect of one or more embodiments of the present invention, a method of real-time broadcast audience engagement independent of the act of broadcasting, means of broadcasting, or broadcasting partner that includes providing a user with a list of broadcast shows currently being broadcast live, receiving the user's selection of a broadcast show to engage with from the list, providing the user with a binary reaction interface for the selected broadcast show, receiving the user's binary reaction based on the user's interaction with the binary reaction interface, and providing the selected broadcast show with one or more metrics of real-time broadcast audience engagement comprising the user's binary reaction.

According to one aspect of one or more embodiments of the present invention, a non-transitory computer readable medium includes software instructions that, when executed by a processor, performs a method of real-time broadcast audience engagement independent of the act of broadcasting, means of broadcasting, or broadcasting partner that includes providing a user with a list of broadcast shows currently being broadcast live, receiving the user's selection of a broadcast show to engage with from the list, providing the user with a binary reaction interface for the selected broadcast show, receiving the user's binary reaction based on the user's interaction with the binary reaction interface, and providing the selected broadcast show with one or more metrics of real-time broadcast audience engagement comprising the user's binary reaction.

Other aspects of the present invention will be apparent from the following description and claims.

BRIEF DESCRIPTION OF THE DRAWINGS

FIG. 5B shows an exemplary metrics interface of a client-side software application for real-time broadcast audience engagement in accordance with one or more embodiments of the present invention.

FIG. 5C shows an exemplary settings interface of a client-side software application for real-time broadcast audience engagement in accordance with one or more embodiments of the present invention.

FIG. 5E shows an exemplary advertiser interface of a client-side software application for real-time broadcast audience engagement in accordance with one or more embodiments of the present invention.

FIG. 5F shows an exemplary location of engagement interface of a client-side software application for real-time broadcast audience engagement in accordance with one or more embodiments of the present invention.

DETAILED DESCRIPTION OF THE INVENTION

Figure 1:
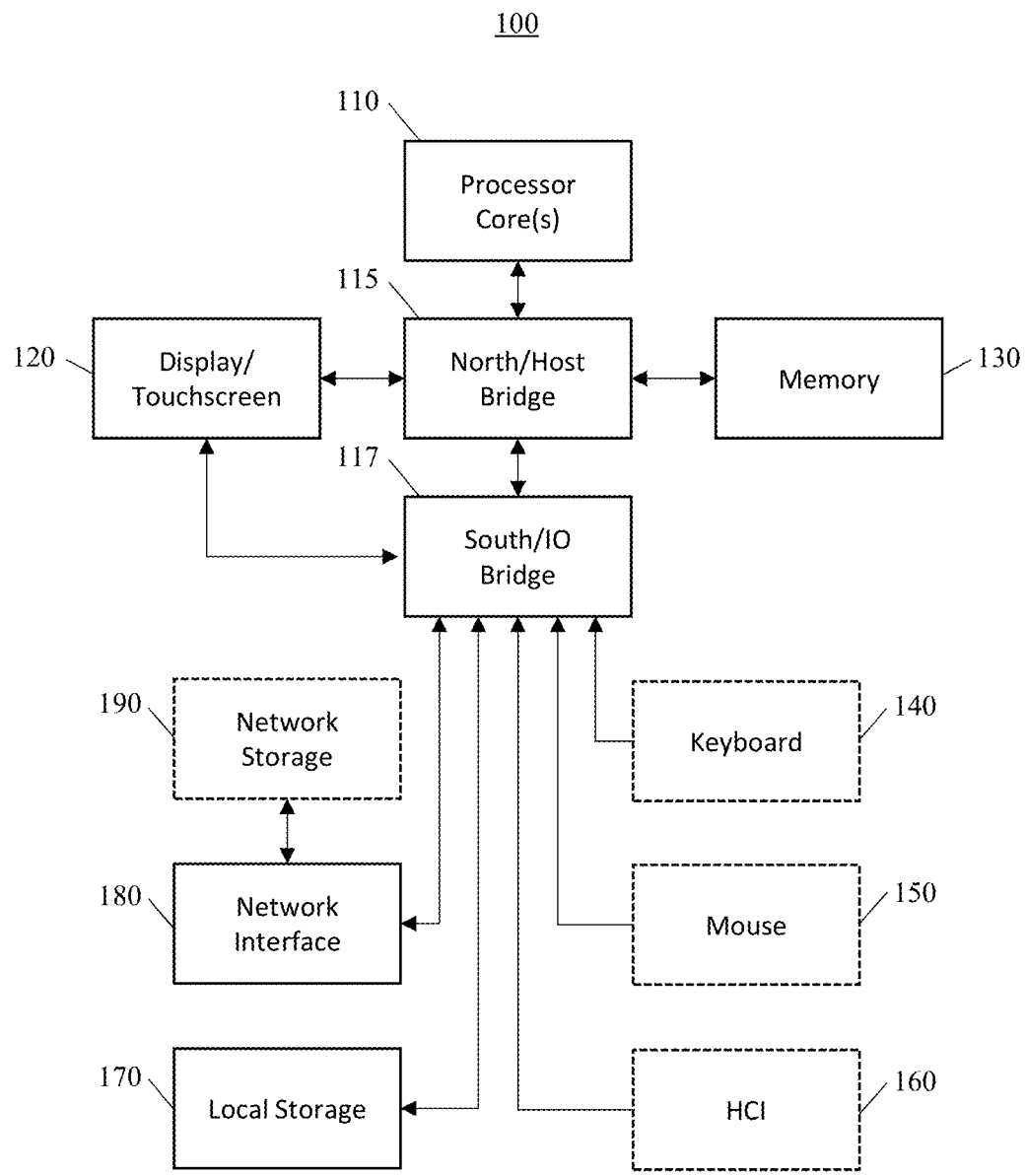
FIG. 1 shows an exemplary computing system for real-time broadcast audience engagement in accordance with one or more embodiments of the present invention.

One or more embodiments of the present invention are described in detail with reference to the accompanying figures. For consistency, like elements in the various figures are denoted by like reference numerals. In the following detailed description of the present invention, specific details are set forth in order to provide a thorough understanding of the present invention. In other instances, well-known features to one of ordinary skill in the art are not described to avoid obscuring the description of the present invention.

For the purpose of this disclosure, a broadcaster is a content generator such as, for example, a radio, television, or Internet program or show, or personnel thereof, that produce a broadcast show for broadcasting. The broadcaster may be distinguished from the act of broadcasting or the broadcasting partner, such as, for example, a radio station, television station, or Internet application or service that facilitates the broadcasting of the broadcast show to the broadcast audience. The term real-time means in near or substantial real-time where delay incurred is merely due to the transmission, processing, or receipt of the data being transmitted, but typically on the order of magnitude of seconds.

Conventionally, broadcast shows use one or more of surveys, ratings, call-in lines, and social media to measure audience engagement after the fact in an ex post facto manner. The surveying process typically includes posing a number of questions to a sample population who are willing to participate and making statistical inferences from the survey responses regarding the preferences of the wider broadcast audience. The surveys are filled out by audience members, such as listeners or viewers of content, regarding the content, typically a substantial time after having consumed it. The survey responses are aggregated, and statistical analysis is performed to extrapolate the results of the survey from the sample population to the wider broadcast audience. The accuracy of surveys is complicated by a number of factors including the type or kind of questions posed, the sample population, and the statistical analysis used. An inherent problem with such surveys is that they are cumbersome, time consuming, and unappealing to large segments of the broadcast audience, which typically skews the sample population in a way that makes it difficult to accurately extrapolate the results of the survey to the wider broadcast audience. Moreover, survey results are not provided in real-time and fail to provide a broadcaster with meaningful metrics of broadcast audience engagement for a given broadcast show while the show is currently being broadcast by one or more broadcasting partners.

Ratings typically require surveys, passive sampling, or active sampling of audience members' content consumption. When ratings are calculated based on surveys, ratings suffer the same issues as noted above with respect to surveys. When ratings are calculated based on sampling, they are complicated by methodological challenges, the sample population, and the statistical analysis used to extrapolate the results of the survey from the sample population to the wider broadcast audience. An inherent problem with ratings is the complex manner in which content is now consumed. Consequently, the statistical analysis is more complicated, less reliable, and it is more difficult to draw actionable inferences from the analysis. For example, a ratings system focused on, for example, only analog broadcast fails to consider digital broadcast, Internet broadcast, and other means of broadcasting and inherently skews the statistical inferences that may be drawn from the sample population. Even when ratings attempt to sample all means of broadcasting, it is difficult to construct an accurate sample population to gauge the views of the wider broadcast audience. Moreover, because of the complication in sampling, analyzing, and drawing inferences, ratings are typically provided to a broadcaster at fixed intervals of days, weeks, or months, after the broadcast has already concluded. As such, ratings are not provided in real-time and fail to provide a broadcaster with meaningful metrics of broadcast audience engagement for a given broadcast show while the show is currently being broadcast by one or more broadcasting partners.

Prior to social media, call-in lines were the only means by which a broadcaster could get a feel for the audience's reaction while broadcasting. However, call-in lines are substantially limited as a metric of real-time broadcast audience engagement. Typically, a broadcast show only has a small number of call-in lines available for such use. A screener for the call-in lines will receive the calls, screen the callers to determine if they will be put through to the host, and then the callers are placed on hold until the host gets to a particular caller, if the host gets to the caller at all. Once the number of incoming calls exceeds the number of call-in lines, no further calls may be received. As such, call-in lines represent an artificially small sample size and there is no way to know whether a few people attempted to call in or hundreds or thousands. While artificially small, the sample is also highly skewed in ways that make it difficult to draw meaningful inferences. The call-in process is cumbersome, time consuming, and expensive as it requires dedicated human resources from the broadcast show. It is not unusual for a caller to be placed on hold for thirty minutes or more, often to not even be put through to the show's host. As such, the type of listener or viewer willing to endure the call-in process typically has strong opinions or a strong desire to share their opinions and may not be representative of the true demographics of the broadcast show's audience. In the event a caller is put on the air with the broadcaster, it often does not make for good broadcasting as some callers have stage fright or difficulty communicating their views, which negatively impacts audience engagement. Moreover, because the caller is typically identified, either by name, image, or voice, many callers are reluctant to share their true opinions if they feel their views will be poorly received or expose them to the judgement or condemnation of others. As such, call-in lines fail to provide a broadcaster with meaningful metrics of broadcast audience engagement for a given show while the broadcast show is currently being broadcast by one or more broadcasting partners.

Social media includes various platforms that facilitate social engagement via the Internet such as, for example, Twitter®, Facebook®, Instagram®, Snapchat®, and others. While many broadcast shows maintain a presence on various social media platforms, they too are substantially limited as a metric of real-time broadcast audience engagement. Social media requires an audience member to identify and navigate to the profile, or tag a username, of a broadcast show on a social media platform, which can be time consuming and cumbersome. Once the audience member is in a position to interact, the moment that they wished to comment on may have already passed. Even if the audience member is able to interact, their engagement may consist of ideograms, such as emojis, text, audio, pictures, or video and may require human intervention and interpretation. As such, it is difficult for a broadcaster to identify, monitor, and tabulate the social media engagement in any meaningful way. This is further complicated by the fact that, because of the lag time between the comment being made, interpreted, and tabulated, the topic at hand may have changed a number of times. As such, it is difficult, if not impossible, to gauge how the engagement relates to the current topic at hand. Similar to call-in lines, the lack of anonymity and the fear of the judgement and condemnation of others can sometimes skew the nature of the engagement. When the social media engagement is more or less anonymous, the nature of the engagement can be further skewed as the commenter feels free to lodge extreme comments, sometimes made only for their entertainment rather than true engagement. As such, attempting to measure bona fide engagement through social media is time consuming, costly, requires substantial human intervention, and is of questionable reliability even when well done. Thus, social media engagement also fails to provide a broadcaster with meaningful metrics of broadcast audience engagement for a given broadcast show while the show is currently being broadcast by one or more broadcasting partners.

These conventional metrics of broadcast audience engagement are cumbersome and typically only appeal to a small number of highly engaged, for better or worse, audience members who may not be representative of the wider broadcast audience. Moreover, because these conventional metrics lack immediacy, proximity, and transparency to the broadcaster actually generating the broadcast content and only provide feedback, if any, to broadcaster well after a broadcast has already concluded, they are of limited value to the broadcaster of a given broadcast show while the show is currently being broadcast. As such, the broadcaster has no way of knowing, in real-time, whether a topic they are currently discussing, or guest is of interest to their audience or whether the topic or guest is causing their audience to lose interest and change the proverbial channel. While many audience members may have a bona fide desire to engage with a broadcaster or broadcast show, they have little opportunity to do so because conventional methods of broadcast audience engagement are cumbersome, lack immediacy, proximity, and transparency to the broadcaster actually generating the broadcast show.

Accordingly, in one or more embodiments of the present invention, a method and system for real-time broadcast audience engagement provides a broadcaster with real-time metrics of broadcast audience engagement for a given broadcast show while the show is currently being broadcast, independent of the act of broadcasting, means of broadcasting, or broadcasting partner. These real-time metrics of broadcast audience engagement may be used by the broadcaster to adjust the content of their broadcast program or show in a manner that improves engagement and listenership or viewership while their broadcast show is currently being broadcast. For example, a broadcaster may determine that a topic or line of discussion is of great interest to the broadcast audience and continue the discussion or explore the topic further. Similarly, the broadcaster may determine that the topic or line of discussion is of little to no interest, or perhaps even upsetting, to the broadcast audience and may move on to another topic of potentially more interest.

In one or more embodiments of the present invention, the methods and systems for real-time broadcast audience engagement disclosed herein are independent of the act of broadcasting, means of broadcasting, or broadcasting partner and provide a sideband of information directly to the broadcaster regarding real-time broadcast audience engagement. As such, consumers of content, such as, for example, listeners or viewers of a radio, television, or Internet program or show, can provide feedback that may be independent of the platform on which they receive the broadcast content. For the purpose of illustration only, a radio station may broadcast a radio program created by a radio broadcaster over the radio airwaves. A listener listening to a radio broadcast show on a home receiver may use his wireless smartphone to provide real-time feedback directly to the broadcaster generating the content, independent of the act of broadcasting, means of broadcasting, or broadcasting partner.

Advantageously, the method and system for real-time broadcast audience engagement is simple, real-time, potentially anonymous, and in certain embodiments, completely independent of broadcasting. As such, a substantially larger segment of the broadcast audience may interact directly with the broadcast show while it is currently being broadcast. Broadcasters may monitor and track broadcast audience engagement in real-time and immediately respond to maintain or improve audience engagement.

One of ordinary skill in the art will recognize that the method and system for real-time broadcast audience engagement may be used with one or more radio, television, or Internet programs, or any other type or kind of broadcast show, including streaming and podcasting, that is broadcast live in accordance with one or more embodiments of the present invention. In addition to providing metrics of real-time broadcast audience engagement to the broadcaster of a particular broadcast show, in certain embodiments, the broadcaster may be provided within metrics of real-time broadcast audience engagement for other broadcast shows or the market or market segment in which they compete.

FIG. 1 shows an exemplary computing system for real-time broadcast audience engagement 100 in accordance with one or more embodiments of the present invention. One of ordinary skill in the art will appreciate that computer system 100 is merely exemplary and various subsets, supersets, or combinations of functions or features described herein, including the integration or distribution of functions or features thereof may be used in accordance with one or more embodiments of the present invention.

Computing system 100 may include one or more processor cores 110 disposed on one or more printed circuit boards (not shown). Each of the one or more processor cores 110 may be a single-core processor (not independently illustrated) or a multi-core processor (not independently illustrated). Multi-core processors typically include a plurality of processor cores disposed on the same physical die (not shown) or a plurality of processor cores disposed on multiple die (not shown) that are collectively disposed within the same mechanical package. Computing system 100 may also include various core logic components such as, for example, a north, or host, bridge device 115 and a south, or input/output ("IO"), bridge device 117. North bridge 115 may include one or more processor interface(s), memory interface(s), graphics interface(s), high speed IO interface(s) (not shown), and south bridge interface(s). South bridge 117 may include one or more IO interface(s). One of ordinary skill in the art will recognize that the one or more processor cores 110, north bridge 115, and south bridge 117, or various subsets, supersets, or combinations of functions or features thereof, may be integrated, in whole or in part, or distributed among various discrete devices in a way that may vary based on an application, design, or form factor in accordance with one or more embodiments of the present invention.

Computing system 100 may include one or more IO devices such as, for example, a display device 120, system memory 130, optional keyboard 140, optional mouse 150, and/or an optional human-computer interface 160. Depending on the application or design of computing system 100, the one or more IO devices may or may not be integrated. Display device 120 may be a touch screen that includes a touch sensor (not independently illustrated) configured to sense touch. For example, a user may interact directly with objects depicted on display device 120 by touch or gestures that are sensed by the touch sensor and treated as input by computing system 100. Computing system 100 may include one or more local storage devices 170. Local storage device 170 may be a solid-state memory device, a solid-state memory device array, a hard disk drive, a hard disk drive array, or any other non-transitory computer readable medium. Computing system 100 may include one or more network interface devices 180 that provide one or more network interfaces. The network interface may be Ethernet, Wi-Fi, Bluetooth, WiMAX, FibreSpe Channel, or any other network interface suitable to facilitate networked communications. Computing system 100 may include one or more network-attached storage devices 190 in addition to, or instead of, one or more local storage devices 170. Network-attached storage device 190 may be a solid-state memory device, a solid-state memory device array, a hard disk drive, a hard disk drive array, or any other non-transitory computer readable medium. Network-attached storage device 190 may or may not be collocated with computing system 100 and may be accessible to computing system 100 via one or more network interfaces provided by one or more network interface devices 180.

One of ordinary skill in the art will recognize that computing system 100 may be a cloud-based server, server, workstation, desktop, laptop, netbook, tablet, smartphone, mobile device, and/or any other type or kind of computing system capable of performing one or more methods as part of one or more systems disclosed herein in accordance with one or more embodiments of the present invention.

Figure 2:
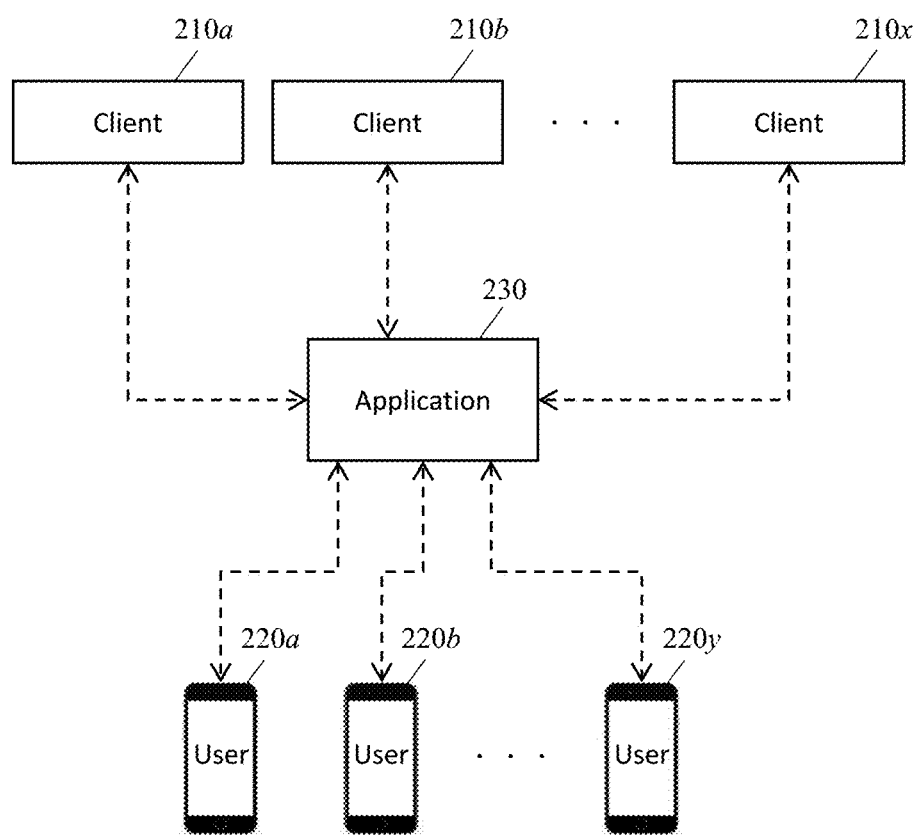
FIG. 2 shows an exemplary system for real-time broadcast audience engagement in accordance with one or more embodiments of the present invention.

FIG. 2 shows an exemplary system for real-time broadcast audience engagement 200 in accordance with one or more embodiments of the present invention. A system for real-time broadcast audience engagement 200 may include one or more application servers 230 configured to execute an application-side software application (not shown) for real-time broadcast engagement, one or more client computing systems 210 configured to execute a client-side software application (not shown) for real-time broadcast engagement, and a plurality of audience members', or users', computing systems 220 configured to execute a user-side software application (not shown) for real-time broadcast engagement. One of ordinary skill in the art will recognize that the one or more application servers 230, the one or more client computing systems 210, and the plurality of user computing systems 220 may be computing systems (e.g., 100 of FIG. 1) that may vary in form factor and feature set and are not necessarily the same. For example, in one or more embodiments of the present invention, an application server 230 may be a server, a workstation, a desktop, or a laptop computing system (e.g., 100 of FIG. 1), while a client computing system 210 may be a server, a workstation, a desktop, a laptop, or a tablet computing system (e.g., 100 of FIG. 1), and a user computing system 220 may be a desktop, a laptop, a netbook, a tablet, a smartphone, a mobile device, or any other type or kind of personal computing system (e.g., 100 of FIG. 1). The one or more client computing systems 210 may communicate with one or more application servers 230 via a network interface (not shown). Similarly, the plurality of user computing systems 220 may communicate with application server 230 via a network interface (not shown). For example, the one or more client computing systems 210 and the plurality of user computing systems 220 may exchange data with application server 230 over an Internet or other network connection.

In certain embodiments, a system for real-time broadcast audience engagement 200 may include a virtualized application server 230 configured to execute the application-side software application for real-time broadcast audience engagement application (e.g., 305 of FIG. 3) that may be instantiated in a cloud-based server (e.g., 100 of FIG. 1) such as those provided by, for example, Amazon AWS®, Microsoft Azure®, Google Cloud®, and other cloud computing service providers. In such embodiments, the components of virtualized application server 230 may be distributed in a manner that is transparent, but potentially unknown, to the end user. Advantageously, cloud-based servers (e.g., 100 of FIG. 1) typically provide physical isolation, fault tolerance, redundancy, and automated backup mechanisms that protect the integrity of data stored therein. In other embodiments, a system for real-time broadcast audience engagement 200 may include a physical application server 230 configured to execute an application-side application for real-time broadcast audience engagement application (e.g., 305 of FIG. 3) that may be hosted by a third party. In still other embodiments, a system for real-time broadcast audience engagement 200 may include a physical application server 230 configured to execute an application-side application for real-time broadcast audience engagement application (e.g., 305 of FIG. 3) that may be hosted internally within an organization. One of ordinary skill in the art will recognize that other types and combinations of computing systems (e.g., 100 of FIG. 1), that may vary based on an application or design, may be used on the application-side, client-side, or user-side applications in accordance with one or more embodiments of the present invention.

Figure 3:
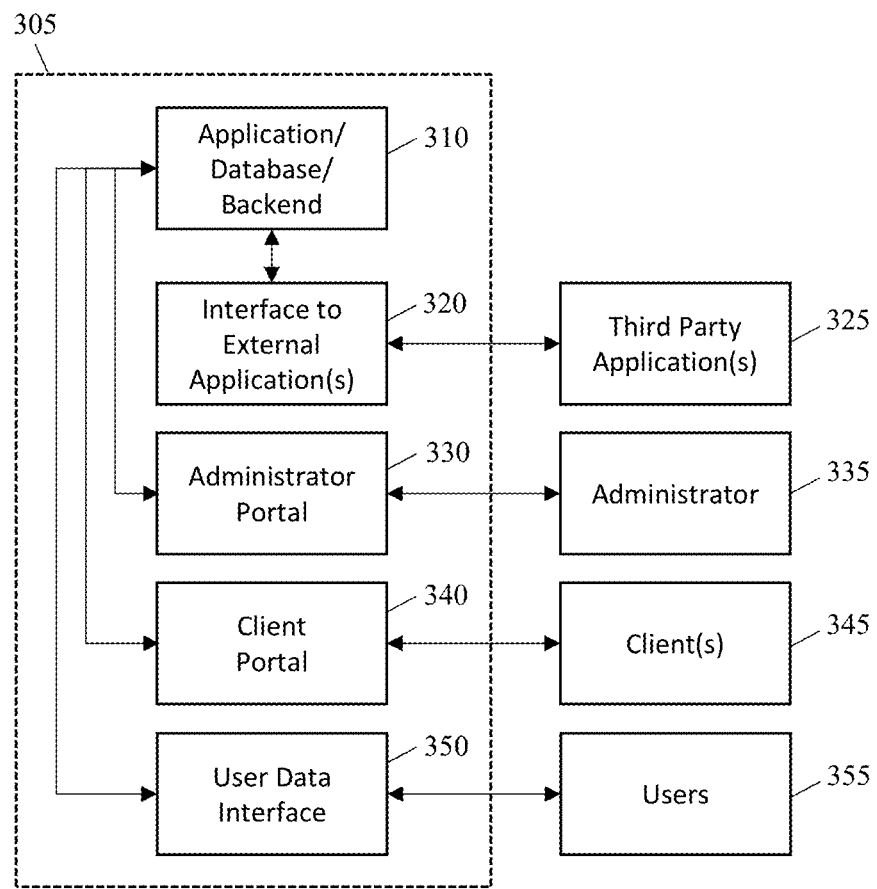
FIG. 3 shows an exemplary block diagram of a software architecture for real-time broadcast audience engagement in accordance with one or more embodiments of the present invention.

FIG. 3 shows an exemplary block diagram of a software architecture for real-time broadcast audience engagement 300 in accordance with one or more embodiments of the present invention. An application-side software application for real-time broadcast audience engagement 305 may be configured to execute on an application server (e.g., 230 of FIG. 2) and perform, in whole or in part, a method of real-time broadcast audience engagement (e.g., 600 of FIG.

6). One or more clients (not shown), such as a broadcast show, may interface with the application-side software application 305 by way of a client portal 340 accessed via a stand-alone software application or web-based portal 345 executing on a client-side computing system (e.g., 210 of FIG. 2). A plurality of users (not shown), such as listeners or viewers of a broadcast show, may interface with the application-side software application 305 by way of a user data interface 350 accessed via a stand-alone software application or web-based portal 355 executing on a user-side computing system (e.g., 220 of FIG. 2), but typically a smartphone, tablet, or other wireless or mobile device (e.g., 100 of FIG. 1).

Application-side software application for real-time broadcast engagement 305 may include an application/database/backend portion 310, an interface to external applications 320, an administrator portal 330, a client portal 340, a user data interface 350, and any other portions, functions, or modules required to instantiate the application 305. Application/database/backend portion 310 may, for example, perform, in whole or in part, the method of real-time broadcast engagement (600 of FIG. 6), coordinate and exchange data with various portions, functions, or modules of application 305, coordinate and exchange data with one or more external applications 320 and portals, including one or more administrator portals 330, client portals 340, and user data interfaces 350, and maintain an internal database used to store data relating to real-time broadcast audience engagement.

An interface to external applications 320 may provide an interface to one or more external or third-party software applications 325, which may optionally be used. For example, in certain embodiments, a third-party statistics application may be used to prepare or analyze statistics as part of providing the metrics of real-time broadcast audience engagement. One of ordinary skill in the art will recognize that any external application 325 configured to use data from, work collaboratively with, or provide data to application 305 may be used in accordance with one or more embodiments of the present invention.

An administrator portal 330 may provide one or more administrators (not shown) access 335 to configure, maintain, and manage software application 305. An administrator (not shown) may access administrator portal 330 via the computing system (e.g., 230 of FIG. 2) on which application-side software application 305 is executing or by way of a stand-alone software application or web-based portal 335 executing on another computing system (e.g., 100 of FIG. 1). Configuration may include setting up client accounts, establishing rights and privileges, and configuring any other options or settings relevant to the configuration of application-side software application 305.

A client portal 340 may provide one or more clients (not shown) access to configure, maintain, and manage their account and receive metrics of real-time broadcast audience engagement as discussed in more detail herein. Each client (not shown) may access client portal 340 via a stand-alone client-side software application or web-based portal 345 for real-time broadcast audience engagement executing on their computing system (e.g., 210 of FIG. 2). Configuration may include configuring preferences, poll questions and answers, advertisements, advertisement options, advertisement rotations, metrics reporting, and other options and settings relevant to the configuration of client-side software application 345.

A user data interface 350 may provide an interface for the exchange of data with a plurality of users (not shown) who are each executing, for example, a stand-alone user-side software application or web-based portal 355 for real-time broadcast audience engagement as discussed in more detail herein. Each user (not shown) may access user portal 350 via a stand-alone client-side software application or web-based portal 355 executing on their computing system (e.g., 220 of FIG. 2).

One of ordinary skill in the art will recognize that various aspects of application-side software application 305, client-side software application 345, and user-side software application 355 and the functions that they implement may be vary and may be distributed in different ways based on an application or design in accordance with one or more embodiments of the present invention.

Figure 4A:
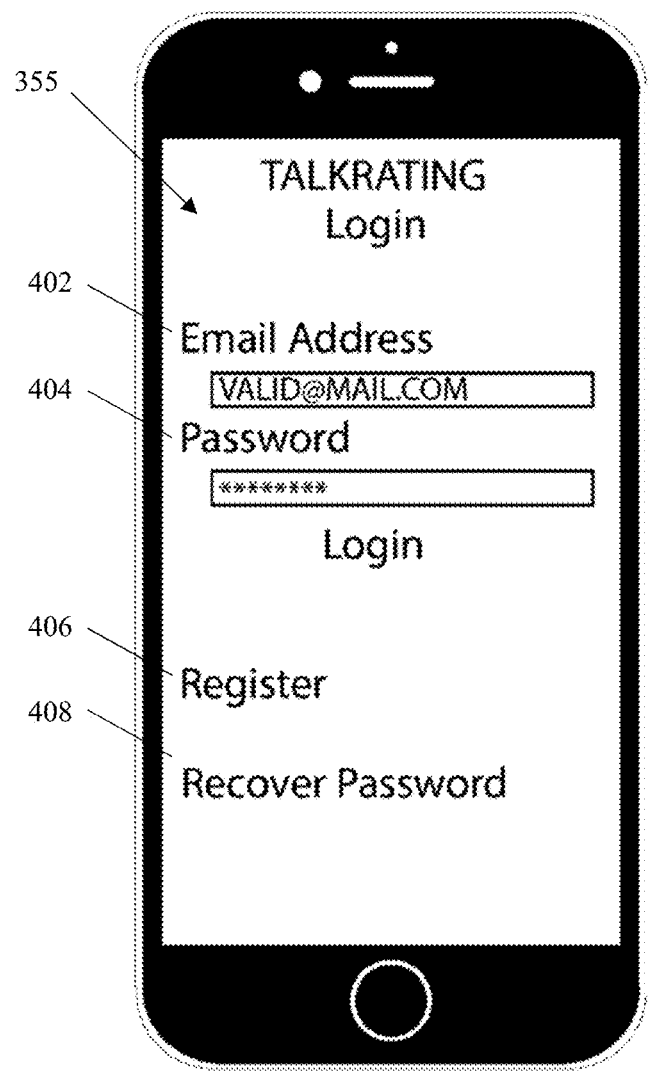
FIG. 4A shows an exemplary login interface of a user-side software application for real-time broadcast audience engagement in accordance with one or more embodiments of the present invention.

FIG. 4A shows an exemplary login interface of a user-side software application 355 for real-time broadcast audience engagement in accordance with one or more embodiments of the present invention. User-side software application 355 may be a stand-alone software application or web-based portal executed on, for example, the user's smartphone (e.g., 220 of FIG. 2). User-side software application 355 may be configured to exchange data with an application-side software application (e.g., 305 of FIG. 3) for real-time broadcast audience engagement. In certain embodiments, a user (not shown) may be able to use user-side software application 355 without providing any login credentials to maintain their anonymity (not shown). In such embodiments, certain functionality of the user-side software application 355 may be limited. In other embodiments, a user (not shown) may be able to login with a username or email address 402 and password 404. The login credentials 402 and 404 may be passed over a network connection (not shown) to the application-side software application for real-time broadcast audience engagement (e.g., 305 of FIG. 3) via a user data interface (e.g., 350 of FIG. 3). The login credentials 402 and 404 may be stored in a database (e.g., 310 of FIG. 3) of the application-side software application (e.g., 305 of FIG. 3) to validate login credentials. In embodiments that use login credentials, user-side software application 355 may allow a new user to register a username or email address 402 and password 404 or recover 408 a forgotten password 404 from the application-side software application (e.g., 305 of FIG. 3). One of ordinary skill in the art will recognize that the exemplary login interface is merely exemplary, not intended to be limiting, and may vary based on an application or design in accordance with one or more embodiments of the present invention.

Figure 4B:
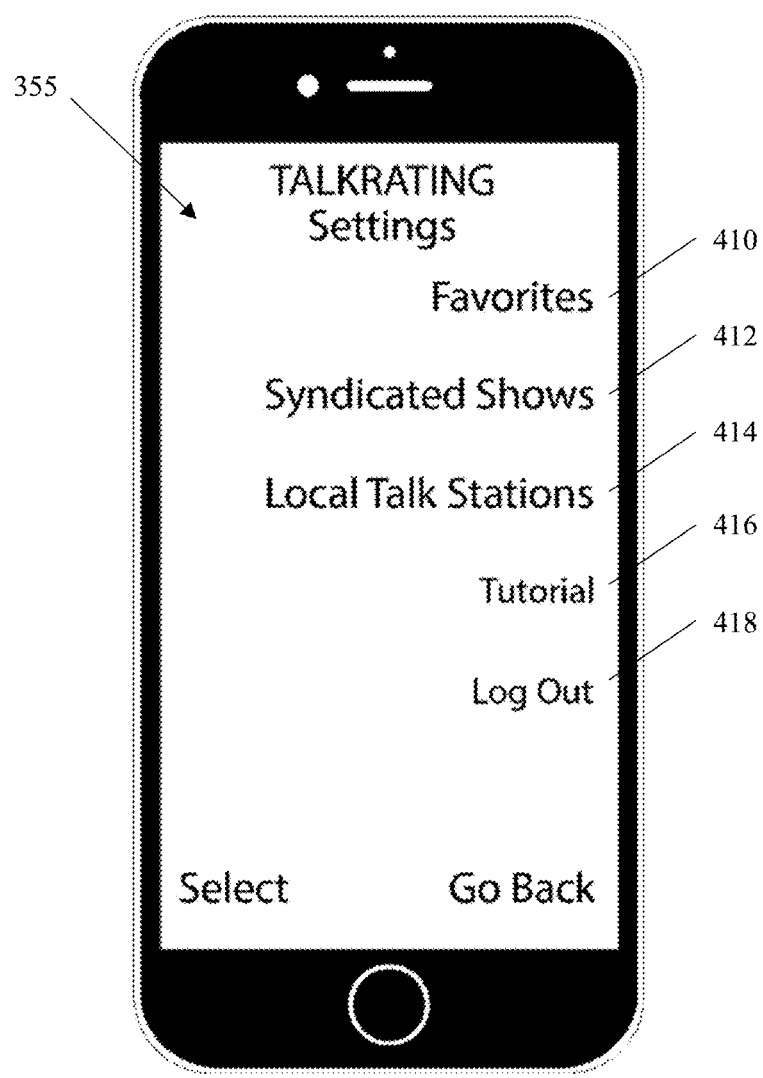
FIG. 4B shows an exemplary settings interface of a user-side software application for real-time broadcast audience engagement in accordance with one or more embodiments of the present invention.

Continuing, FIG. 4B shows an exemplary settings interface of a user-side software application 355 for real-time broadcast audience engagement in accordance with one or more embodiments of the present invention. The settings interface may be the initially displayed, or home, screen or accessed by touching or clicking on an icon (not shown) displayed on a display device of the user's computing system 220. The settings interface may include one or more of favorites 410, syndicated shows 412, local talk shows 414, a tutorial 416, a logout 418, and any other type or kind of options or settings relevant to such use. Favorites 410 may include a list of those broadcast shows that are currently being broadcast that the user has previously interacted with or indicated to be a favorite, which may include radio, television, Internet, or any other type or kind of broadcast shows. Syndicated shows 412 may include a list of syndicated broadcast shows that are currently being broadcast, which may include radio, television, Internet, or any other type or kind of broadcast shows. Local talk shows 414 may include a list of local talk shows that are currently being broadcast in the user's area as determined by a user provided location or a geolocation determined by the location of the user's computing system 220, which may also include radio, television, Internet, or any other type or kind of broadcast shows. Optionally, a tutorial 416 may be included that provides a tutorial on how to use application 355. Optionally, in embodiments that use login credentials, a logout 418 may be included that allows a user to securely logout of application 355. One of ordinary skill in the art will recognize that the exemplary settings interface is merely exemplary, not intended to be limiting, and may vary based on an application or design in accordance with one or more embodiments of the present invention.

Figure 4C:
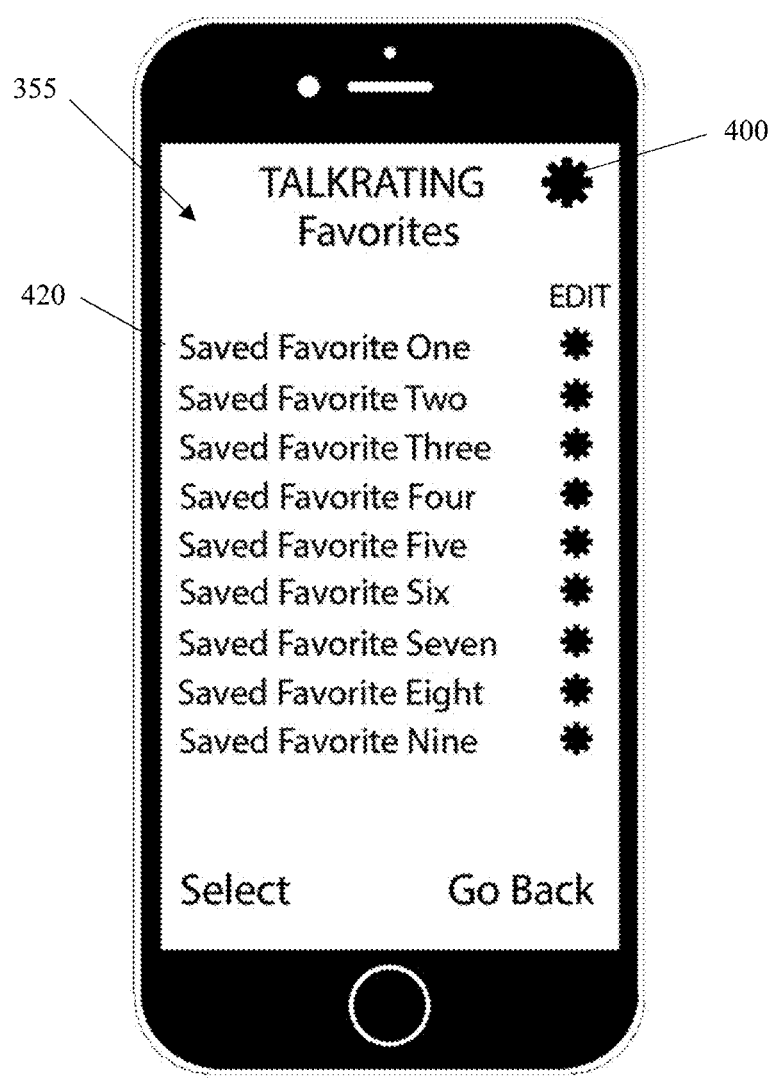
FIG. 4C shows an exemplary favorites interface of a user-side software application for real-time broadcast audience engagement in accordance with one or more embodiments of the present invention.

Continuing, FIG. 4C shows an exemplary favorites interface of a user-side software application 355 for real-time broadcast audience engagement in accordance with one or more embodiments of the present invention. On the favorites interface (accessed via 410 of FIG. 4B), one or more favorite broadcast shows 420, which are currently being broadcast, may be displayed for quick and easy access to the corresponding binary reaction interface (not shown) by a returning user. The user's favorites may be stored locally on their computing system 220 or provided to the user-side software application 355 by the application side software application (e.g., 305 of FIG. 3) via a network interface (not shown) and hashed with a list of broadcast shows that are currently being broadcast live. The list of broadcast shows currently being broadcast live may be determined locally by the user-side software application 355 via its network interface (not shown) or provided to the user-side software application 355 by the application-side software application (e.g., 305 of FIG. 3) via a network interface (not shown). A user may return to their initial, or home, screen by touching or clicking on icon 400. One of ordinary skill in the art will recognize that the exemplary favorites interface is merely exemplary, not intended to be limiting, and may vary based on an application or design in accordance with one or more embodiments of the present invention.

Figure 4D:
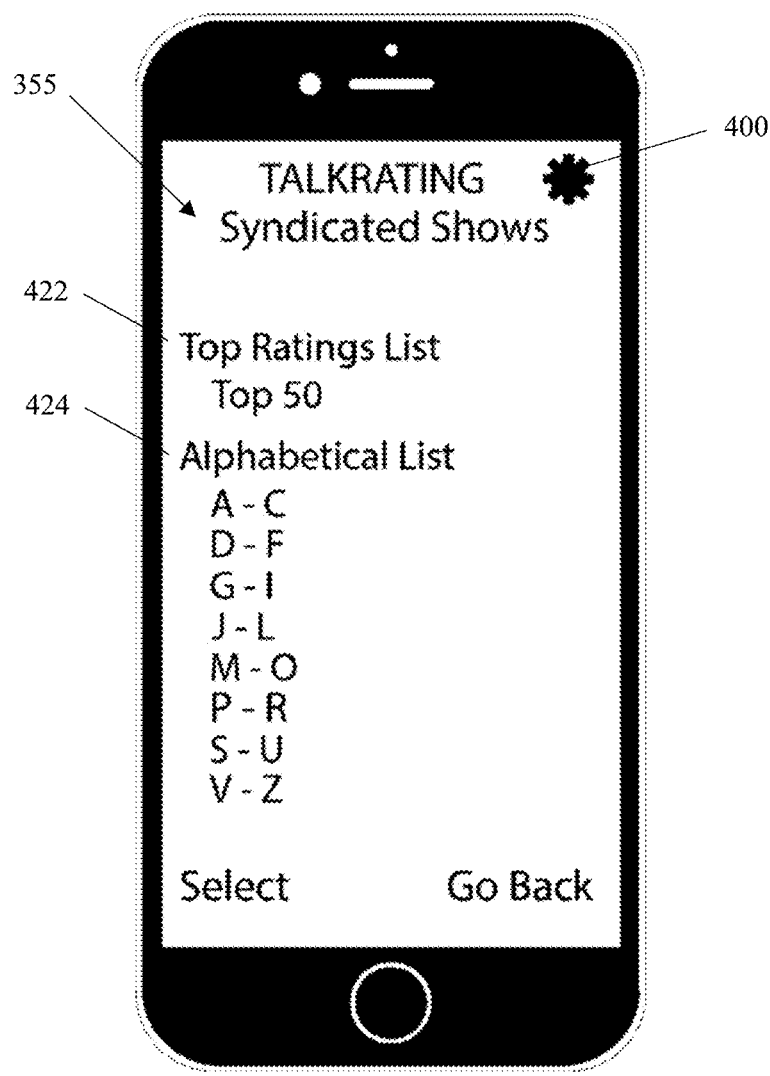
FIG. 4D shows an exemplary syndicated shows interface of a user-side software application for real-time broadcast audience engagement in accordance with one or more embodiments of the present invention.

Continuing, FIG. 4D shows an exemplary syndicated shows interface of a user-side software application 355 for real-time broadcast audience engagement in accordance with one or more embodiments of the present invention. On the syndicated shows interface (accessed via 412 of FIG. 4B), one or more syndicated broadcast shows (not shown), which are currently being broadcast, may be displayed for quick and easy access to the corresponding binary reaction interface (not shown) by a user. In certain embodiments, a list of top-rated syndicated shows 422 may be provided. In other embodiments, an alphabetical list of syndicated shows 424 may be included. The list of syndicated shows, top rated syndicated shows, or alphabetical list of syndicated shows currently being broadcast live may be determined locally by the user-side software application 355 via its network interface (not shown) or provided to the user-side software application 355 by the application-side software application (e.g., 305 of FIG. 3) via a network interface (not shown). A user may return to their initial, or home, screen by touching or clicking on icon 400. One of ordinary skill in the art will recognize that the exemplary syndicated shows interface is merely exemplary, not intended to be limiting, and may vary based on an application or design in accordance with one or more embodiments of the present invention.

Figure 4E:
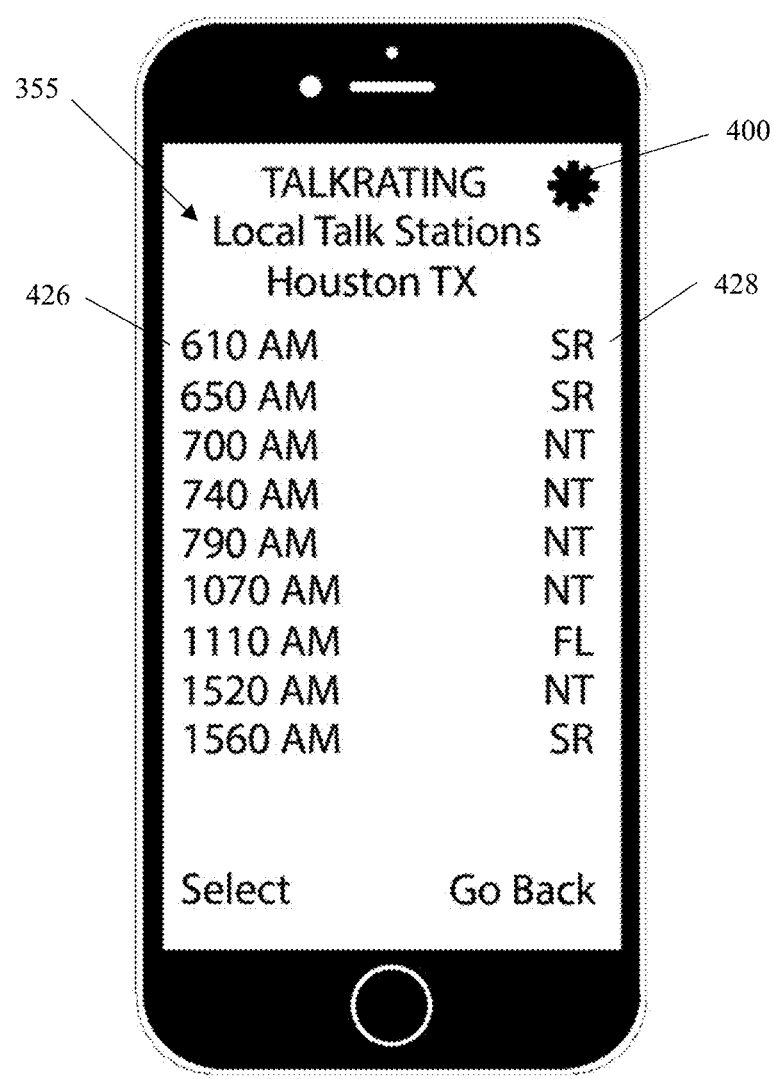
FIG. 4E shows an exemplary local talk shows interface of a user-side software application for real-time broadcast audience engagement in accordance with one or more embodiments of the present invention.

Continuing, FIG. 4E shows an exemplary local talk shows interface of a user-side software application 355 for real-time broadcast audience engagement in accordance with one or more embodiments of the present invention. On the local talk shows interface (accessed via 414 of FIG. 4B), one or more local talk shows 426, which are currently being broadcast, may be displayed for quick and easy access to the corresponding binary reaction interface (not shown) by a user. The list of local talk shows currently being broadcast live may be determined locally by the user-side software application 355 via its network interface (not shown) or provided to the user-side software application 355 by the application-side software application (e.g., 305 of FIG. 3) via a network interface (not shown). In certain embodiments, an indication 428 of whether a broadcast show is a sports talk program ("SR"), a news talk program ("NT"), a financial/legal talk program ("FL"), or other type of program may be included to facilitate a user finding a broadcast show of interest. A user may return to their initial, or home, screen by touching or clicking on icon 400. One of ordinary skill in the art will recognize that the exemplary local talk shows interface is merely exemplary, not intended to be limiting, and may vary based on an application or design in accordance with one or more embodiments of the present invention.

Figure 4F:
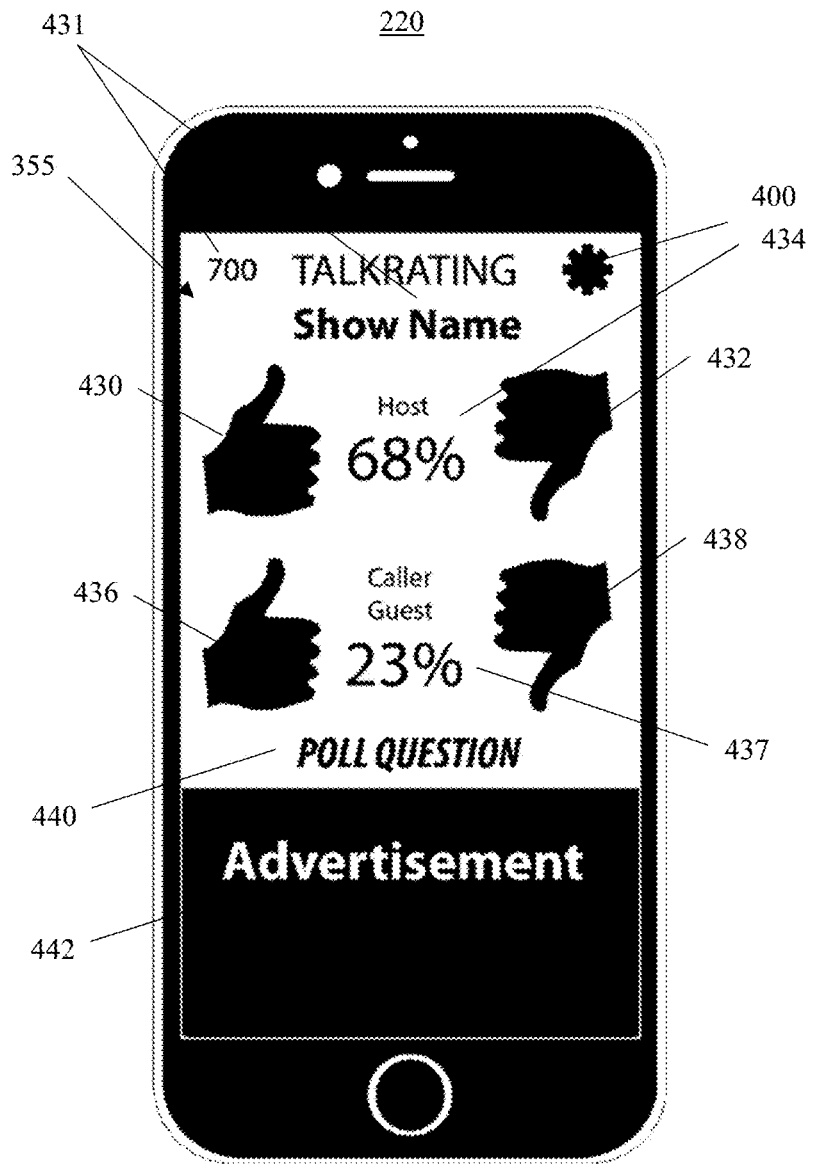
FIG. 4F shows an exemplary binary reaction interface of a user-side software application for real-time broadcast audience engagement in accordance with one or more embodiments of the present invention.

Continuing, FIG. 4F shows an exemplary binary reaction interface of a user-side software application 355 for real-time broadcast audience engagement in accordance with one or more embodiments of the present invention. As discussed above, a significant portion of a broadcast audience has a desire to engage directly with the broadcast show or broadcaster while a broadcast show is currently being broadcast. Conventional means of broadcast audience engagement are cumbersome and lack immediacy and tend to discourage and dramatically reduce the number of audience members who actually engage with the broadcast show or broadcaster. As such, a distinguishing aspect of the method and system for real-time broadcast audience engagement is the simplified, intuitive, and real-time manner in which audience members may engage directly with a broadcast show or broadcaster, independent of the act of broadcasting, means of broadcasting, or broadcasting partner, through a binary reaction interface while a broadcast show is currently being broadcast.

For purposes of illustration, a user (not shown) of the user-side application for real-time broadcast audience engagement 355 may be listening or viewing a broadcast show as an audience member. The user may launch the user-side software application 355 on, for example, their smartphone (e.g., 220 of FIG. 2) to engage with the broadcaster of the broadcast show. The user may locate the listing for the broadcast show they are listening or viewing and click to launch the binary reaction interface corresponding to that broadcast show. The user-side software application 355 may display a simplified binary reaction interface that allows the user to lodge a reaction to the content they are currently listening to or viewing (potentially on another device). For purposes of monitoring, tracking, and reporting engagement, the audience member, or user, may lodge a positive reaction or a negative reaction on their smartphone (e.g., 220 of FIG. 2) to the content that is currently being broadcast independently. In certain embodiments, the binary reaction interface may include a visual depiction, such as an icon, corresponding to a positive reaction or a negative reaction. For example, a positive reaction to a broadcaster may be depicted by a "thumbs-up" icon (or other ideogram corresponding to a positive reaction) 430 and a negative reaction may be depicted by a "thumbs-down" icon (or other ideogram corresponding to a negative reaction) 432. While the user is listening to, or viewing, the content currently being broadcast, the user may simply touch or click on the positive reaction icon 430 or the negative reaction icon 432 to lodge their binary reaction. The user-side software application 355 may transmit this binary reaction to the application-side software application (e.g., 305 of FIG. 3) via a network interface (not shown) for aggregation and reporting to one or more clients (e.g., 210 of FIG. 2). User-side software application 355 may display one or more statistics 434, provided by the application-side software application (e.g., 305 of FIG. 3), corresponding to, for example, the positive reaction percentage for the audience members currently participating in the real-time broadcast engagement application. In certain embodiments, the application-side software application (e.g., 305 of FIG. 3) may restrict the interval by which the user's binary reaction may be received to prevent gaming of the statistic. One of ordinary skill in the art will recognize that the interval may vary based on an application or design. Optionally, one or more station, broadcast show, or broadcaster identifiers 431 may be displayed to confirm the broadcast show that the user is current engaging with through the user-side software application 355. It is important to recognize that the user may engage with the broadcaster via the user-side software application 355 executing on their device (e.g., 220 of FIG. 2), independent of broadcasting.

Optionally, user-side software application 355 may include an additional and potentially separate binary reaction interface for a caller or guest. While the user is listening to, or viewing, the content currently being broadcast, the user may simply touch or click on the positive reaction icon 436 or the negative reaction icon 438 to lodge their binary reaction. The user-side software application 355 may transmit this binary reaction to the application-side software application (e.g., 305 of FIG. 3) via a network interface (not shown) for aggregation and reporting to one or more clients (e.g., 210 of FIG. 2). User-side software application 355 may display one or more statistics 437, provided by the application-side software application (e.g., 305 of FIG. 3), corresponding to, for example, the percentage of positive reactions for audience members currently participating in the real-time broadcast engagement application. In certain embodiments, the application-side software application (e.g., 305 of FIG. 3) may restrict the interval by which the user's binary reaction may be received to prevent gaming of the statistic. One of ordinary skill in the art will recognize that the interval may vary based on an application or design in accordance with one or more embodiments of the present invention.

Optionally, user-side software application 355 may reserve a portion of the display for an advertisement interface 442 that may include an advertisement for an advertiser of the broadcast show and pushed to the user-side software application 355 by the application-side software application (e.g., 305 of FIG. 3). Advertisement interface 442 may include text, graphical, audio, or video content and may include a hyperlink or clickable content. The user-side software application 355 may transmit an indication that a user clicked on the hyperlink or clickable content to the application-side software application (e.g., 305 of FIG. 3) via a network interface (not shown) for aggregation and reporting to one or more clients (e.g., 210 of FIG. 2). Advantageously, a broadcast show may advertise directly to engaged users on the user-side software application 355 in a manner that is completely independent of the broadcasting.

Figure 4G:
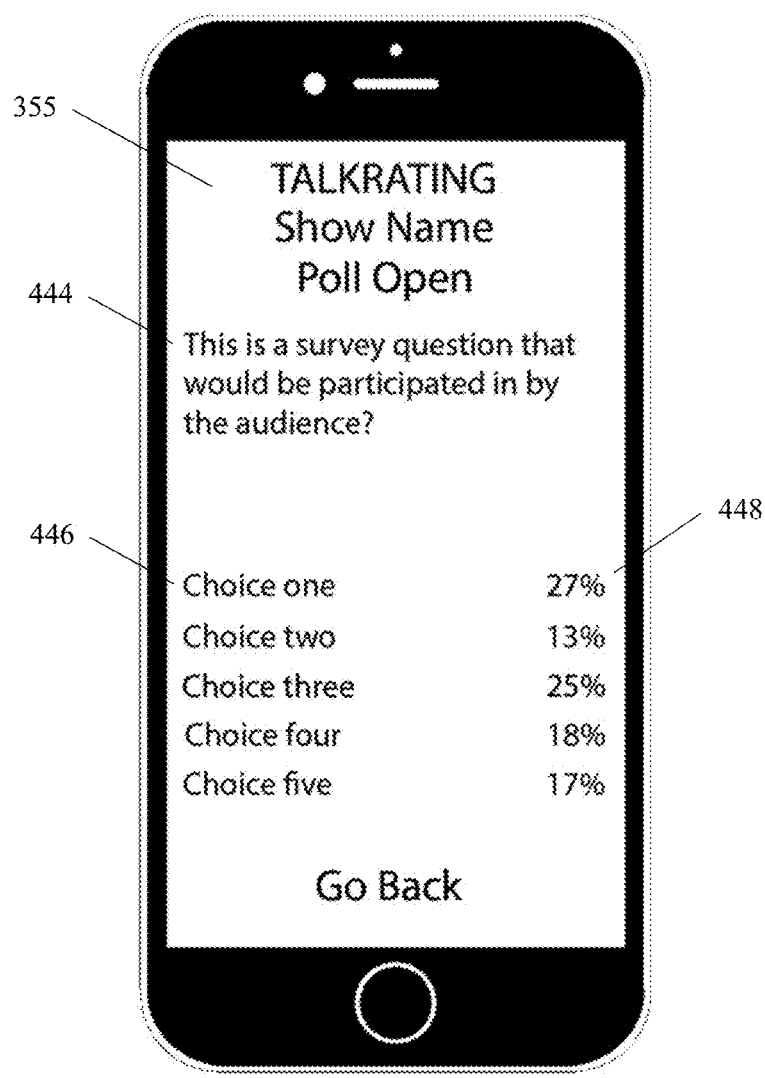
FIG. 4G shows an exemplary poll interface of a user-side software application for real-time broadcast audience engagement in accordance with one or more embodiments of the present invention.

Optionally, user-side software application 355 may reserve a portion of the display for a poll interface link 440 that may direct the user to a poll question posed by a client (broadcast show) that may be relevant to the content currently being broadcast (e.g., FIG. 4G). If the user wishes to participate, the user may simply touch or click on the poll interface link 440.

Optionally, user-side software application 355 may reserve a portion of the display for an emoji, emoticon, or emotion interface (not shown) comprised of icons (not shown) representing varying degrees of content or discontent. The user (not shown) may lodge their feeling regarding the broadcast content with the broadcaster.

One of ordinary skill in the art will recognize that the exemplary binary reaction interface is merely exemplary, not intended to be limiting, and may vary based on an application or design in accordance with one or more embodiments of the present invention.

Continuing, FIG. 4G shows an exemplary poll interface of a user-side software application 355 for real-time broadcast audience engagement in accordance with one or more embodiments of the present invention. The poll interface may include a poll question 444 posed by a client (broadcast show) and a plurality of canned responses 446. If the user wishes to participate, the user may simply touch or click on the canned poll response 446 of their choice. The user-side software application 355 may transmit the poll response 446 to the application-side software application (e.g., 305 of FIG. 3) via a network interface (not shown) for aggregation and reporting to one or more clients (e.g., 210 of FIG. 2). User-side software application 355 may display one or more statistics 448, provided by the application-side software application (e.g., 305 of FIG. 3), corresponding to, for example, the percentage of votes for each of the canned poll responses from audience members currently participating in the real-time broadcast engagement application once the user's poll response has been lodged. One of ordinary skill in the art will recognize that the exemplary poll interface is merely exemplary, not intended to be limiting, and may vary based on an application or design in accordance with one or more embodiments of the present invention.

Figure 5A:
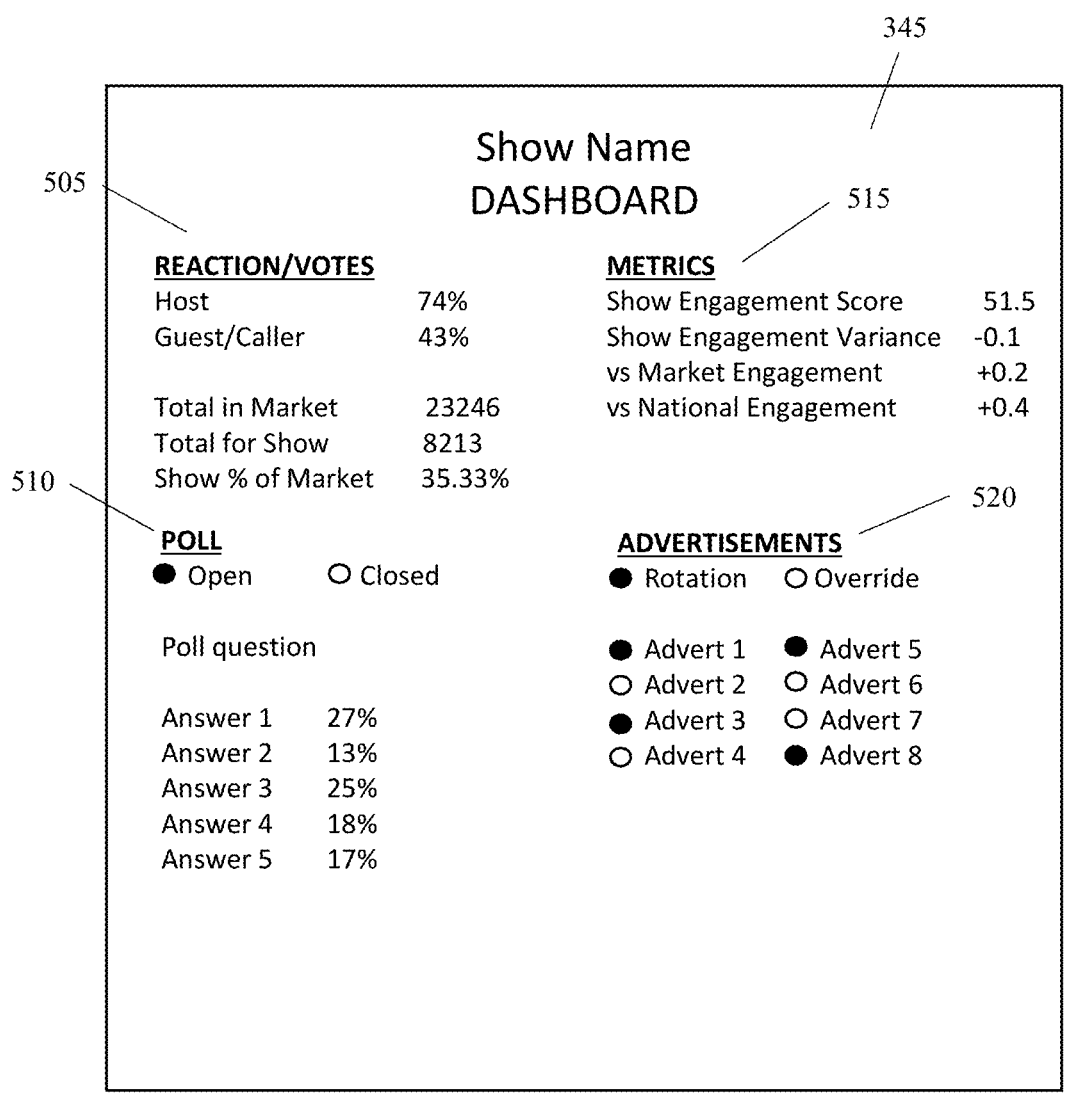
FIG. 5A shows an exemplary dashboard interface of a client-side software application for real-time broadcast audience engagement in accordance with one or more embodiments of the present invention.

FIG. 5A shows an exemplary dashboard interface of a client-side software application for real-time broadcast audience engagement 345 in accordance with one or more embodiments of the present invention. A client, such as a broadcast show, may log into the dashboard interface of the client-side software application for real-time broadcast audience engagement 345 on their computing device (e.g., 210 of FIG. 2) and view various metrics of real-time broadcast audience engagement in real-time while their broadcast show is currently being broadcast, independent of the act of broadcasting, means of broadcasting, or broadcasting partner. The application-side software application (e.g., 305 of FIG. 3) may aggregate and share data with the client-side software application 345 via a network interface (not shown). The client-side software application 345 may include one or more of a reaction display 505, a poll display 510, a metrics display 515, and an advertisement display 520.

Reaction display 505 may show aggregated statistics for the broadcast show, broadcaster, or host, and optionally aggregated statistics for a caller or guest. The aggregated statistics may show a number of positive reactions and a number of negative reactions (not shown) or a percentage of, for example, positive reactions as a percentage, for all users participating in the real-time broadcast audience engagement for the selected broadcast show. The aggregated statistics may include a rolling average of positive reactions and a rolling average of negative reactions to ensure that the reactions are timely and relevant to the content currently being broadcast. In addition, the aggregated statistics may display a total number of audience members participating in the real-time broadcast audience engagement application for a given market, a total number of audience members participating in the real-time broadcast audience engagement application for their particular broadcast show, and their percentage of the market. Each of which may also be measured as a rolling average. One of ordinary skill in the art will recognize that other aggregated statistics may be used in accordance with one or more embodiments of the present invention. Poll display 510 may include an indication of whether a poll is open or closed and show a percentage of aggregated votes for each canned poll response. Poll display 510 may optionally include a choice to turn a poll question on or off that is pushed down to the user-side software applications 355 via the application-side software application (e.g., 305 of FIG. 3).

Metrics display 515 may include one or more metrics of real-time broadcast audience engagement. In certain embodiments, the one or more metrics may include an engagement score, an engagement variance, a comparison-to-market engagement score, and a comparison-to-national engagement score. In certain embodiments, the engagement score may be calculated by dividing a total number of binary reactions, positive or negative, received from all participating users for the show currently being broadcast that are received within a predetermined period of time by a total number of audience members for the selected broadcast show, the resulting quantity multiplied by a normalization factor. One of ordinary skill in the art will recognize that the predetermined period of time may vary based on an application or design. One of ordinary skill in the art will recognize that other methods of calculating an engagement score may be used in accordance with one or more embodiments of the present invention. An engagement variance may be a statistical variance of the calculated engagement score. A comparison-to-market engagement score may be calculated by subtracting an average engagement for other shows in the same market from the calculated engagement score for the selected broadcast show of interest. Similarly, a comparison-to-national engagement score may be calculated by subtracting an average engagement score for other shows nationwide from the engagement score for the selected broadcast show of interest.

Advertisement display 520 may include an option to rotate through selected advertisements or an override that allows the broadcast show to select specific ads to run. In addition, the advertisement display may include a listing of advertisements and a selection interface for inclusion in the rotation or for the override. Once selected, the advertisements are pushed according to the clients instructions to the application-side software application (e.g., 305 of FIG. 3) to the plurality of users engaging with the selected broadcast show via the user-side software application 355, completely independent of the means of broadcasting the actual broadcast show. One of ordinary skill in the art will recognize that the exemplary dashboard interface is merely exemplary, not intended to be limiting, and may vary based on an application or design in accordance with one or more embodiments of the present invention.

Continuing, FIG. 5B shows an exemplary metrics interface of a client-side software application for real-time broadcast audience engagement 345 in accordance with one or more embodiments of the present invention. The metrics interface may allow a client to run reports on historical metrics of real time broadcast audience engagement, such as positive reactions, negative reactions, percentage positive reactions, engagement scores, comparison-to-market engagement scores, and comparison-to-national engagement scores for a user-specified time interval 525. In addition, the client may select one or more individuals to receive the reports or email alerts regarding real time broadcast audience engagement 530. For example, in certain embodiments, the client may configure, through the client-side software application 345, the application-side software application (e.g., 305 of FIG. 3) to send alert emails, text messages, or other messaging service to alert a broadcast show or broadcaster when a metric of real-time broadcast audience engagement meets, exceeds, or falls below a threshold value. One of ordinary skill in the art will recognize that the exemplary metrics interface is merely exemplary, not intended to be limiting, and may vary based on an application or design in accordance with one or more embodiments of the present invention.

Continuing, FIG. 5C shows an exemplary settings interface of a client-side software application for real-time broadcast audience engagement 345 in accordance with one or more embodiments of the present invention. The settings interface may allow a client to change one or more of their login credentials 535, such as, for example, a username (not shown), a password, a show name 540, a web address for the client show 545, or any other information or settings that may be relevant to such use. One of ordinary skill in the art will recognize that the exemplary settings interface is merely exemplary, not intended to be limiting, and may vary based on an application or design in accordance with one or more embodiments of the present invention.

Figure 5D:
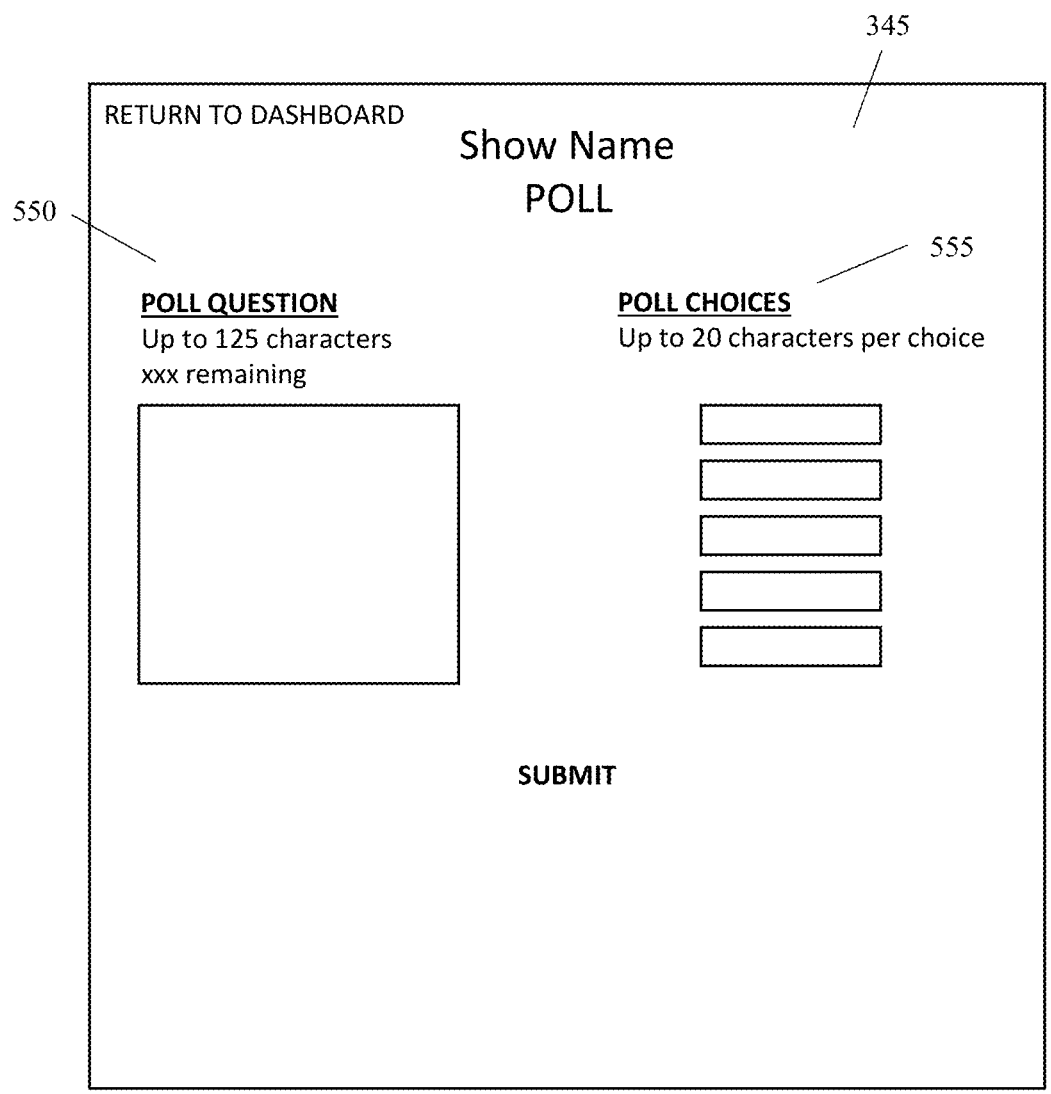
FIG. 5D shows an exemplary poll interface of a client-side software application for real-time broadcast audience engagement in accordance with one or more embodiments of the present invention.

Continuing, FIG. 5D shows an exemplary poll interface of a client-side software application for real-time broadcast audience engagement 345 in accordance with one or more embodiments of the present invention. The poll interface may allow a client to enter a poll question and one or more canned poll responses that are relevant to, for example, content currently being broadcast. Once entered, the client-side software application 345 may transmit the poll question and one or more canned poll responses to the application-side software application (e.g., 305 of FIG. 3), which in turn pushes the poll question and responses down to users currently engaging with the broadcast show via their user-side software application 355, completely independent of the means of broadcasting the actual broadcast show. One of ordinary skill in the art will recognize that the exemplary poll interface is merely exemplary, not intended to be limiting, and may vary based on an application or design in accordance with one or more embodiments of the present invention.

Continuing, FIG. 5E shows an exemplary advertiser interface of a client-side software application for real-time broadcast audience engagement 345 in accordance with one or more embodiments of the present invention. The advertiser interface may allow a client to create advertisements (not shown) for one or more advertisers (not shown) that are ultimately pushed to users. The advertiser interface may input one or more of identifying information 560 for a particular advertisement, advertisement verbiage 565, and advertisement graphics 570. Once entered, the client-side software application 345 may transmit the advertisement to the application-side software application (e.g., 305 of FIG. 3), which in turn pushes the advertisement to users currently engaging with the broadcast show, completely independent of the means of broadcasting, via their user-side software application 355, in accordance with the client's rotation or override (e.g., 520 of FIG. 5A) selection entered via the client-side software application's dashboard interface (e.g., FIG. 5A). One of ordinary skill in the art will recognize that the exemplary advertiser interface is merely exemplary, not intended to be limiting, and may vary based on an application or design in accordance with one or more embodiments of the present invention.

Continuing, FIG. 5F shows an exemplary location of engagement interface of a client-side software application for real-time broadcast audience engagement 210 in accordance with one or more embodiments of the present invention. It is anticipated that a majority of users of the user-side software application for real-time broadcast audience engagement will execute the user-side software application on a smartphone or other wireless and mobile device. These devices typically determine their location based on one or more location services including, for example, GPS, Wi-Fi access point, trilateration, and triangulation, and this information is readily available to the user-side software application. As such, in certain embodiments, the user's location may be provided to the application-side software application. The location information may include a latitude, longitude, or any other means of identifying a location of the user. This information may be correlated with the user's use of the user-side software application for real-time broadcast audience engagement, including, for example, what broadcast show they are currently engaging with. One of ordinary skill in the art will recognize that the exemplary location of engagement interface is merely exemplary, not intended to be limiting, and may vary based on an application or design in accordance with one or more embodiments of the present invention.

Figure 5G:
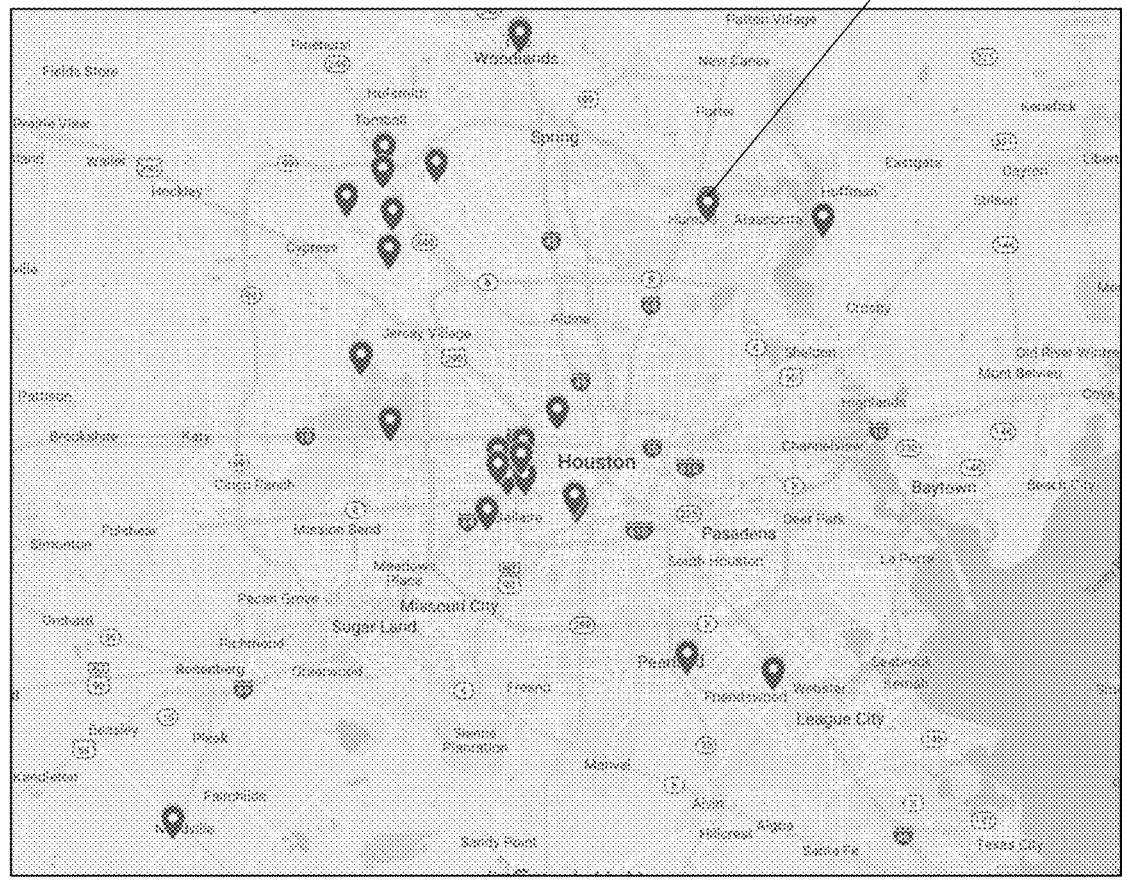
FIG. 5G shows an exemplary graphical display of location information of engaged users of a client-side software application for real-time broadcast audience engagement in accordance with one or more embodiments of the present invention.

Continuing, FIG. 5G shows an exemplary graphical display of location information of engaged users of a client-side software application for real-time broadcast audience engagement 210 in accordance with one or more embodiments of the present invention. The application-side software application may provide the client-side software application with information similar to that shown in FIG. 5F that allows the client-side software application to generate a map showing a location of users currently engaging with a particular broadcast show. In this way, a client (i.e., a broadcaster or broadcast show) may visualize where their engaged users are located on a map. The map may be provided by a third-party or incorporated into the client-side software application. The location of users engaged with a particular broadcast show may be displayed on the map by pin 590, showing their last location correlated with their engagement. One of ordinary skill in the art will recognize that the exemplary graphical display of location information of engaged users is merely exemplary, not intended to be limiting, and may vary based on an application or design in accordance with one or more embodiments of the present invention.

Figure 6:
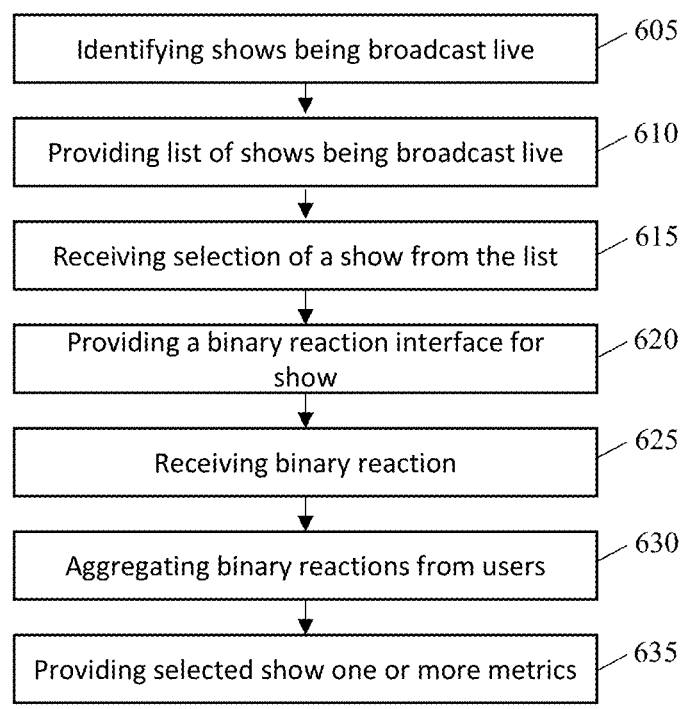
FIG. 6 shows an exemplary method of real-time broadcast audience engagement in accordance with one or more embodiments of the present invention.

FIG. 6 shows an exemplary method of real-time broadcast audience engagement 600 independent of the act of broadcasting, the means of broadcasting, or broadcasting partner in accordance with one or more embodiments of the present invention. For the purpose of this disclosure, a user is a user of the user-side application for real-time broadcast audience engagement that enables the user to engage directly with the broadcaster of a broadcast show independent of the act of broadcasting, means of broadcasting, or broadcasting partner for which the user is also an audience member.

As discussed above, a system for real-time broadcast audience engagement may include an application-side software application executing on one or more application servers or computing systems, a client-side software application executing on one or more clients' computing systems, and a user-side software application executing on a plurality of users' computing systems. The client-side software application and the user-side software application may be either stand-alone software applications or web-based access to their respective portals of the application-side software application. The method of real-time broadcast audience engagement may be performed, in whole, or in part, by the application-side software application, the application-side software application in conjunction with data received from the user-side software application, the application-side software application in conjunction with data received from the client-side software application, or the user-side software application in conjunction with the client-side software application. One of ordinary skill in the art will recognize that one or more features or functions of the method and system for real-time broadcast audience engagement may be integrated, distributed, or otherwise distributed among the application-side software application, user-side software application, and client-side software application, and may vary based on an application or design, in accordance with one or more embodiments of the present invention.

In step 605, a plurality of broadcast shows currently being broadcast live may be identified. In certain embodiments, the identification may be performed by the application-side software application for real-time broadcast audience engagement and provided to the user-side software application over a network connection. In other embodiments, the identification may be performed by the user-side software application for real-time broadcast audience engagement. In either case, the identification comprises identifying one or more broadcast shows including, but not limited to, local talk shows, terrestrial radio shows, satellite radio shows, terrestrial television shows, satellite television shows, cable television shows, syndicated shows, streaming shows, podcast shows, or web-based shows that are currently being broadcast live. For the purpose of this disclosure the phrase broadcast live means the content is being broadcast at substantially the same time that the broadcaster is producing the content for broadcast and reception by the broadcast audience, with minimal delay inherent in the transmission and reception of the content and any preprogrammed time-delays. The broadcast shows may comprise audio and/or video content depending on the type or kind of broadcast show or transmission medium. The identification process may be performed by generating an itemized list of broadcast shows and the times and days that they broadcast live, generating a list of clients of the real-time broadcast audience engagement application, their shows, and the times and days that they broadcast live, or querying a database that maintains such information. This information may be cross-referenced with the time, date, and location of the user based on, for example, the GPS or Wi-Fi determined location of the user's device (e.g., 220 of FIG. 2) in order to provide the user with a bona fide list of broadcast shows that are currently being broadcast live. Because the applications for real-time broadcast audience engagement are independent of the act of broadcasting, means of broadcasting, and broadcasting partner, the list may contain radio, television, Internet, or any other type or kind of program that may be broadcasting live and participating in the real-time broadcast audience engagement.

In step 610, a list of broadcast shows currently being broadcast live may be provided to the user of the user-side software application for real-time broadcast audience engagement. In certain embodiments, the list may be provided by the application-side software application for real-time broadcast audience engagement to the user via the user-side software application for real-time broadcast audience engagement. In other embodiments, the list may be generated and provided to the user by the user-side software application for real-time broadcast audience engagement itself. In still other embodiments, the list may be generated and provided to the user from a third-party that provides the information to either the application-side or user-side application for real-time broadcast audience engagement. The list may represent a compilation of broadcast shows and their broadcast times such that the application-side software application or user-side software application may generate the list of broadcast shows currently being broadcast live for the user of the user-side software application, typically based on the location of the user's device (e.g., 220 of FIG. 2) and independent of the act of broadcasting, the means of broadcasting, the broadcasting partner, or reception of the broadcast.

In step 615, the user using the user-side application for real-time broadcast audience engagement may peruse the list of broadcast shows that are currently being broadcast live and select a broadcast show to engage with via the user-side software application for real-time broadcast audience engagement, again independent of the broadcasting or reception of the broadcast. The user's selection of a broadcast show to engage with may be provided to one or more of the application-side application for real-time broadcast audience engagement and the user-side application for real-time broadcast audience engagement.

In step 620, a binary reaction interface may be provided to the user. A binary reaction may correspond to a positive reaction or a negative reaction of an audience member. The binary reaction interface may be provided via the user-side software application for real-time broadcast audience engagement. However, various aspects of the binary reaction interface, such as, for example, a display of a rolling average of positive reactions, a rolling average of negative reactions, a rolling average of a percentage of positive reactions, a poll question, canned poll responses, and advertisements, may be pushed to the user-side software application for real-time broadcast audience engagement by the application-side software application for real-time broadcast audience engagement.

The user-side software application may display a simplified binary reaction interface that allows the user/audience member to lodge a reaction to the content they are currently listening to or viewing (potentially on another device from that on which they are consuming the content). For purposes of monitoring, tracking, and reporting engagement, the user/audience member may lodge a positive reaction or a negative reaction to the content that is currently being broadcast. In certain embodiments, the binary reaction interface may include a visual depiction, such as an icon, corresponding to a positive reaction or a negative reaction. For example, a positive reaction to a broadcaster may be depicted by a "thumbs-up" icon (or other ideogram corresponding to a positive reaction) and a negative reaction may be depicted by a "thumbs-down" icon (or other ideogram corresponding to a negative reaction). While the user is listening to, or viewing, the content currently being broadcast live, the user may simply touch or click on the positive reaction icon or the negative reaction icon to lodge their binary reaction. In certain embodiments, the application-side software application or user-side software application may restrict the interval by which the user's binary reaction may be received to prevent gaming of the statistic. One of ordinary skill in the art will recognize that the interval may vary based on an application or design. In typical applications, the user may be executing the user-side software application on a device such as, for example, a wireless smartphone, that is completely independent of the act of broadcasting, the means of broadcasting, or broadcasting partner, but through the binary reaction interface, allows the user to engage directly with the broadcaster in an independent manner.

In step 625, the user's binary reaction, based on the user's interaction with the binary reaction interface of the user-side software application for real-time broadcast audience engagement, may be received by the application-side software application for real-time broadcast audience engagement. The user-side software application may transmit this binary reaction to the application-side software application via a network interface, such as, for example, a cellular data connection, for aggregation and reporting to one or more clients.

In step 630, a plurality of binary reactions from a plurality of users/audience members for the selected broadcast show that is being broadcast live, may be aggregated by the application-side software application for real-time broadcast audience engagement so that various metrics of real-time broadcast audience engagement may be calculated and provided to one or more clients in real-time.

In step 635, one or more metrics of real-time broadcast audience engagement including the user's binary reaction may be provided to the selected broadcast show (i.e., client broadcaster or broadcast show).

In one or more embodiments of the present invention, a metric of real-time broadcast audience engagement may comprise one or more of a rolling average of positive reactions from the plurality of users/audience members for the selected broadcast show currently being broadcast live, a rolling average of negative reactions from the plurality of users/audience members for the selected broadcast show currently being broadcast live, and a percentage of positive reactions calculated from a rolling average of positive reactions and a rolling average of negative reactions from the plurality of users/audience members for the selected broadcast show currently being broadcast live.

In one or more embodiments of the present invention, a metric of real-time broadcast audience engagement may comprise one or more calculated metrics of real-time broadcast audience engagement. The calculated metrics of real-time broadcast audience engagement may include an audience engagement score calculated by dividing a total number of binary reactions received for the selected broadcast show from the plurality of users/audience members for the selected broadcast show in a predetermined period of time by a total number of users/audience members for the selected broadcast show, the resulting quantity multiplied by a normalization factor. One of ordinary skill in the art will recognize that the predetermined period of time may vary based on an application or design. The calculated metrics of real-time broadcast audience engagement may include a comparison-to-market engagement score calculated by subtracting an average engagement score for other broadcast shows (not the selected one the user/audience member is engaging with) in the market for the selected broadcast show from the engagement score for the selected broadcast show. The calculated metrics of real-time broadcast audience engagement may include a comparison-to-national engagement score calculated by subtracting an average engagement score for other shows (not the selected one the user/audience member is engaging with) nationwide from the engagement score for the selected broadcast show.

In one or more embodiments of the present invention, a metric of real-time broadcast audience engagement may comprise one or more of a rolling average of an engagement score calculated for the selected broadcast show, a rolling average of a comparison-to-market engagement score, and a rolling average of a comparison-to-national engagement score. One of ordinary skill in the art will recognize that other metrics may be used in accordance with one or more embodiments of the present invention.

In certain embodiments, one or more of a real-time total number of active users/audience members in a market, a total number of active users/audience members for the selected broadcast show, and a percentage of active users/audience members for the selected broadcast show in the market may optionally be provided to the client, selected broadcast show. Active users/audience members may include those users/audience members who are engaging with a show via the user-side software application for real-time broadcast audience engagement.

In certain embodiments, the method may optionally provide the user/audience member with a poll interface. The client, or selected broadcast show, may, through the poll interface of the client-side software application, push a poll question and a plurality of canned responses to active users/audience members via the user-side software application. The application-side software application may receive the user's/audience member's poll response based on the user's/audience member's interaction with the poll interface. The application-side software application may aggregate the poll responses from the plurality of users/audience members for the selected broadcast show and provide the selected broadcast show a real-time summary of the plurality of poll responses received from the plurality of users/audience members.

In certain embodiments, the method may optionally provide the user/audience member with an advertisement interface. The client, or selected broadcast show, may, through the advertisement interface of the client-side software application, push an advertisement directly to active users/audience members via the user-side software application independent of the act of broadcasting, means of broadcasting, or broadcasting partner. The application-side software application may receive the user's/audience member's advertisement engagement based on the user's/audience member's interaction with the advertisement interface, aggregate advertisement engagements from a plurality of users/audience members for the selected broadcast show, and provide the selected broadcast show a real-time summary of the plurality of advertisement engagements from the plurality of audience members.

One of ordinary skill in the art will recognize that a subset, superset, or other combinations or permutations of any of the above-noted steps, or others disclosed herein, may be used in accordance with one or more embodiments of the present invention. One of ordinary skill in the art will also recognize that a non-transitory computer readable medium comprising software instructions that, when executed by a processor, may perform the above-noted methods of real-time broadcast audience engagement in accordance with one or more embodiments of the present invention.

Advantages of one or more embodiments of the present invention may include one or more of the following:

In one or more embodiments of the present invention, a method and system for real-time broadcast audience engagement that is independent of the act of broadcasting, means of broadcasting, or broadcasting partner providing a user/audience member with the ability to directly engage in real-time with the broadcaster of a broadcast show currently being broadcast.

In one or more embodiments of the present invention, a method and system for real-time broadcast audience engagement provides a simple, efficient, and reliable way for broadcast shows to monitor, track, and manage their broadcast audience engagement in real-time.

In one or more embodiments of the present invention, a method and system for real-time broadcast audience engagement allows broadcast shows to modify their content and improve engagement based on their real-time broadcast audience engagement.

In one or more embodiments of the present invention, a method and system for real-time broadcast audience engagement allows audience members to anonymously provide their opinion on the performance or content of a broadcast show in real-time that is markedly different from, more efficient than, and more effective than traditional sources of audience feedback that are typically not in real-time, resource limited, and discourage audience participation.

In one or more embodiments of the present invention, a method and system for real-time broadcast audience engagement encourages audience members to provide honest and genuine feedback on the performance of the broadcast show they are listening to in real-time. Because the audience engagement is anonymous, audience members are free to share their opinions without being identified or feeling judged.

In one or more embodiments of the present invention, a method and system for real-time broadcast audience engagement provides a simple user interface that allows users to provide simple, efficient, and reliable binary feedback in real-time. For example, in certain embodiments, a user may simply touch or click on the "thumbs-up" or the "thumbs-down" icon on their smart phone to voice their anonymous opinion in real-time about the content of the broadcast show.

In one or more embodiments of the present invention, a method and system for real-time broadcast audience engagement improves listenership or viewership by providing a platform for simple, efficient, and reliable audience participation that makes audience members feel like they have a voice and are part of a larger community.

In one or more embodiments of the present invention, a method and system for real-time broadcast audience engagement improves engagement because it appeals to a substantially larger segment of the listening or viewing audience. It is simpler, more efficient, and more reliable than traditional sources of feedback and requires very little effort on the part of the audience member.

In one or more embodiments of the present invention, a method and system for real-time broadcast audience engagement is less time consuming, less costly, and more reliable than attempts to measure engagement through traditional sources of feedback such as surveys ratings, call-in lines, and social media which lack immediacy.

In one or more embodiments of the present invention, a method and system for real-time broadcast audience engagement provides broadcast shows with real-time broadcast audience engagement while the broadcast show is being broadcast. In some cases, broadcast shows make certain broadcast shows available after they have aired for download, streaming, or podcasting. The broadcast shows may look to one or more metrics of real-time broadcast audience engagement when the show was being broadcast as a criteria in determining whether to make the broadcast show available after it aired for download, streaming, or podcasting.

While the present invention has been described with respect to the above-noted embodiments, those skilled in the art, having the benefit of this disclosure, will recognize that other embodiments may be devised that are within the scope of the invention as disclosed herein. Accordingly, the scope of the invention should be limited only by the appended claims.

What is claimed is:

1. A method of real-time broadcast audience engagement independent of the act of broadcasting, means of broadcasting, or broadcasting partner comprising:
providing a user with a list of broadcast shows currently being broadcast live;
receiving the user's selection of a broadcast show to engage with from the list;
providing the user with a binary reaction interface for the selected broadcast show;
receiving the user's binary reaction based on the user's interaction with the binary reaction interface; and
providing the selected broadcast show with one or more metrics of real-time broadcast audience engagement comprising the user's binary reaction.

2. The method of claim 1, further comprising:
identifying a plurality of broadcast shows currently being broadcast live.

3. The method of claim 1, further comprising:
aggregating a plurality of binary reactions from a plurality of users for the selected broadcast show; and
providing the selected broadcast show a real-time summary of the plurality of binary reactions from the plurality of users.

4. The method of claim 1, further comprising:
providing the selected broadcast show one or more of a real-time total number of active users in a market, a total number of active users for the selected broadcast show, and a percentage of active users for the selected broadcast show in the market.

5. The method of claim 1, further comprising:
providing the user with a poll interface;
receiving the user's poll response based on the user's interaction with the poll interface;
aggregating poll responses from a plurality of users for the selected broadcast show; and
providing the selected broadcast show a real-time summary of the plurality of poll responses from the plurality of users.

6. The method of claim 1, further comprising:
providing the user with an advertisement interface;
receiving the user's advertisement engagement based on the user's interaction with the advertisement interface;
aggregating advertisement engagements from a plurality of users for the selected broadcast show; and
providing the selected broadcast show a real-time summary of the plurality of advertisement engagements from the plurality of users.

7. The method of claim 1, wherein a metric of real-time broadcast audience engagement comprises a real-time summary of a plurality of binary reactions from a plurality of users.

8. The method of claim 1, wherein a metric of real-time broadcast audience engagement comprises an engagement score calculated by dividing a total number of binary reactions received for the selected broadcast show in a predetermined period of time by a total number of users for the selected broadcast show, multiplied by a normalization factor.

9. The method of claim 1, wherein a metric of real-time broadcast audience engagement comprises a comparison-to-market engagement score calculated by subtracting an average engagement score for other broadcast shows in the market from the engagement score for the selected broadcast show.

10. The method of claim 1, wherein a metric of real-time broadcast audience engagement comprises a comparison-to-national engagement score calculated by subtracting an average engagement score for other shows nationwide from the engagement score for the selected broadcast show.

11. The method of claim 1, wherein a metric of real-time broadcast audience engagement comprises one or more of a rolling average of an engagement score, a rolling average of a comparison-to-market engagement score, and a rolling average of a comparison-to-national engagement score.

12. The method of claim 1, wherein the user's binary reaction corresponds to a positive reaction or negative reaction of the user.

13. The method of claim 1, wherein the binary reaction interface comprises a visual depiction of a positive reaction and a visual depiction of a negative reaction.

14. The method of claim 1, wherein the user's binary reaction is received on a restricted interval.

15. The method of claim 1, wherein the list of shows currently available comprises one or more of local talk shows, terrestrial radio shows, satellite radio shows, terrestrial television shows, satellite television shows, cable television shows, syndicated shows, streaming shows, podcast shows, or web-based shows that are currently being broadcast live.

16. A non-transitory computer readable medium comprising software instructions that, when executed by a processor, perform a method of real-time broadcast audience engagement independent of the act of broadcasting, means of broadcasting, or broadcasting partner comprising:
providing a user with a list of broadcast shows currently being broadcast live;
receiving the user's selection of a broadcast show to engage with from the list;
providing the user with a binary reaction interface for the selected broadcast show;
receiving the user's binary reaction based on the user's interaction with the binary reaction interface; and
providing the selected broadcast show with one or more metrics of real-time broadcast audience engagement comprising the user's binary reaction.

17. The non-transitory computer readable medium of claim 16, wherein a metric of real-time broadcast audience engagement comprises a real-time summary of a plurality of binary reactions from a plurality of users.

18. The non-transitory computer readable medium of claim 16, wherein a metric of real-time broadcast audience engagement comprises an engagement score calculated by dividing a total number of binary reactions received for the selected broadcast show in a predetermined period of time by a total number of users for the selected broadcast show, multiplied by a normalization factor.

19. The non-transitory computer readable medium of claim 16, wherein a metric of real-time broadcast audience engagement comprises a comparison-to-market engagement score calculated by subtracting an average engagement score for other broadcast shows in the market from the engagement score for the selected broadcast show.

20. The non-transitory computer readable medium of claim 16, wherein a metric of real-time broadcast audience engagement comprises a comparison-to-national engagement score calculated by subtracting an average engagement score for other shows nationwide from the engagement score for the selected broadcast show.

21. The non-transitory computer readable medium of claim 1, wherein a metric of real-time broadcast audience engagement comprises one or more of a rolling average of an engagement score, a rolling average of a comparison-to-market engagement score, and a rolling average of a comparison-to-national engagement score.

\* \* \* \* \*